United States Patent [19]
Minami et al.

[11] 4,155,277
[45] May 22, 1979

[54] AUTOMATIC SPEED CHANGE CONTROL APPARATUS

[75] Inventors: Teruo Minami, Kawasaki; Terukazu Ito, Isehara, both of Japan

[73] Assignee: Kabushiki Kaisha Komatsu Seisakusho, Tokyo, Japan

[21] Appl. No.: 786,521

[22] Filed: Apr. 11, 1977

[30] Foreign Application Priority Data

Apr. 14, 1976 [JP] Japan .................................. 51-41995
Apr. 28, 1976 [JP] Japan .................................. 51-48764
Jun. 21, 1976 [JP] Japan .................................. 51-73031
Jun. 22, 1976 [JP] Japan .................................. 51-73668

[51] Int. Cl.² ...................... B60K 41/04; B60K 41/24
[52] U.S. Cl. ..................................... 74/866; 74/867; 192/12 C
[58] Field of Search ............... 74/866, 867, 731, 732, 74/733, 752 A, 752 D; 192/12 C, 109 F

[56] References Cited

U.S. PATENT DOCUMENTS

| | | | |
|---|---|---|---|
| 3,724,295 | 4/1973 | Wakamatsu et al. | 74/866 |
| 4,033,202 | 7/1977 | Ahlen et al. | 74/866 |
| 4,034,627 | 7/1977 | Mizote | 74/866 |
| 4,038,889 | 8/1977 | Lindow et al. | 74/866 |
| 4,039,061 | 8/1977 | Pruvot et al. | 74/866 X |

*Primary Examiner*—Leonard H. Gerin
*Attorney, Agent, or Firm*—Ladas, Parry, Von Gehr, Goldsmith & Deschamps

[57] ABSTRACT

The control apparatus is capable of setting an automatic speed changing point corresponding to the output of the throttle position of an internal combustion engine and changing an automatic speed change range in accordance with an operation mode of a range select lever. The control apparatus is further capable of setting upper and lower limit speeds of the automatic speed change range.

9 Claims, 22 Drawing Figures

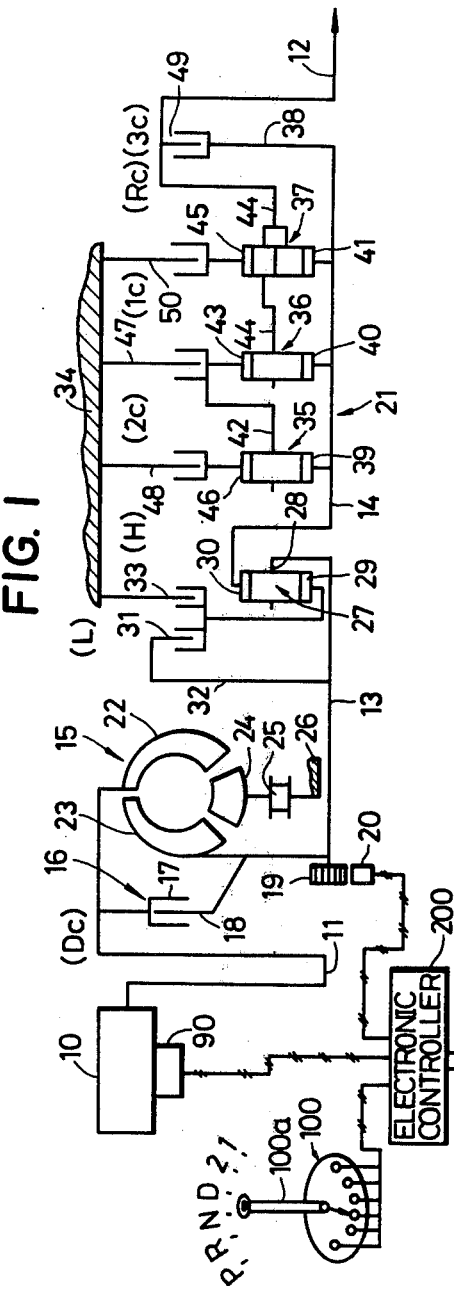
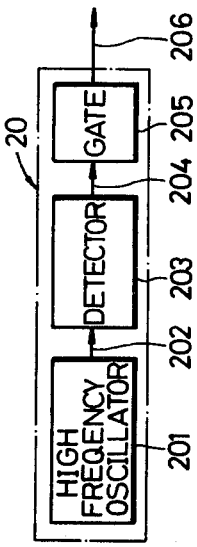
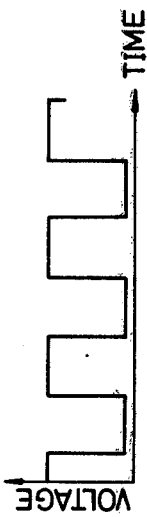
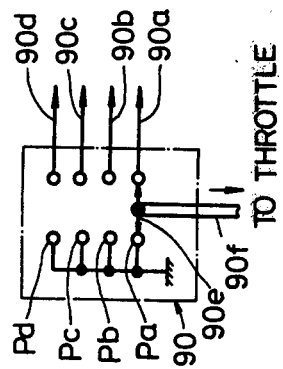

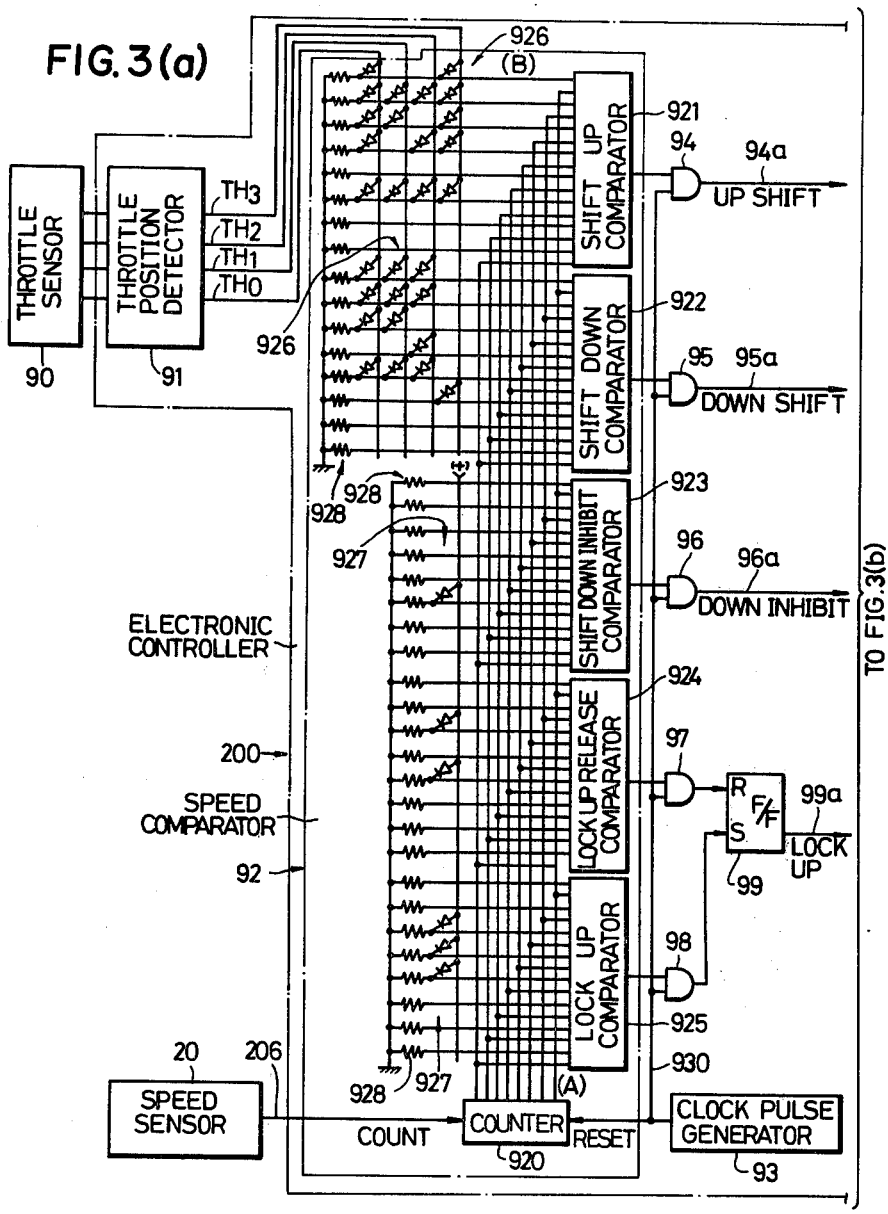

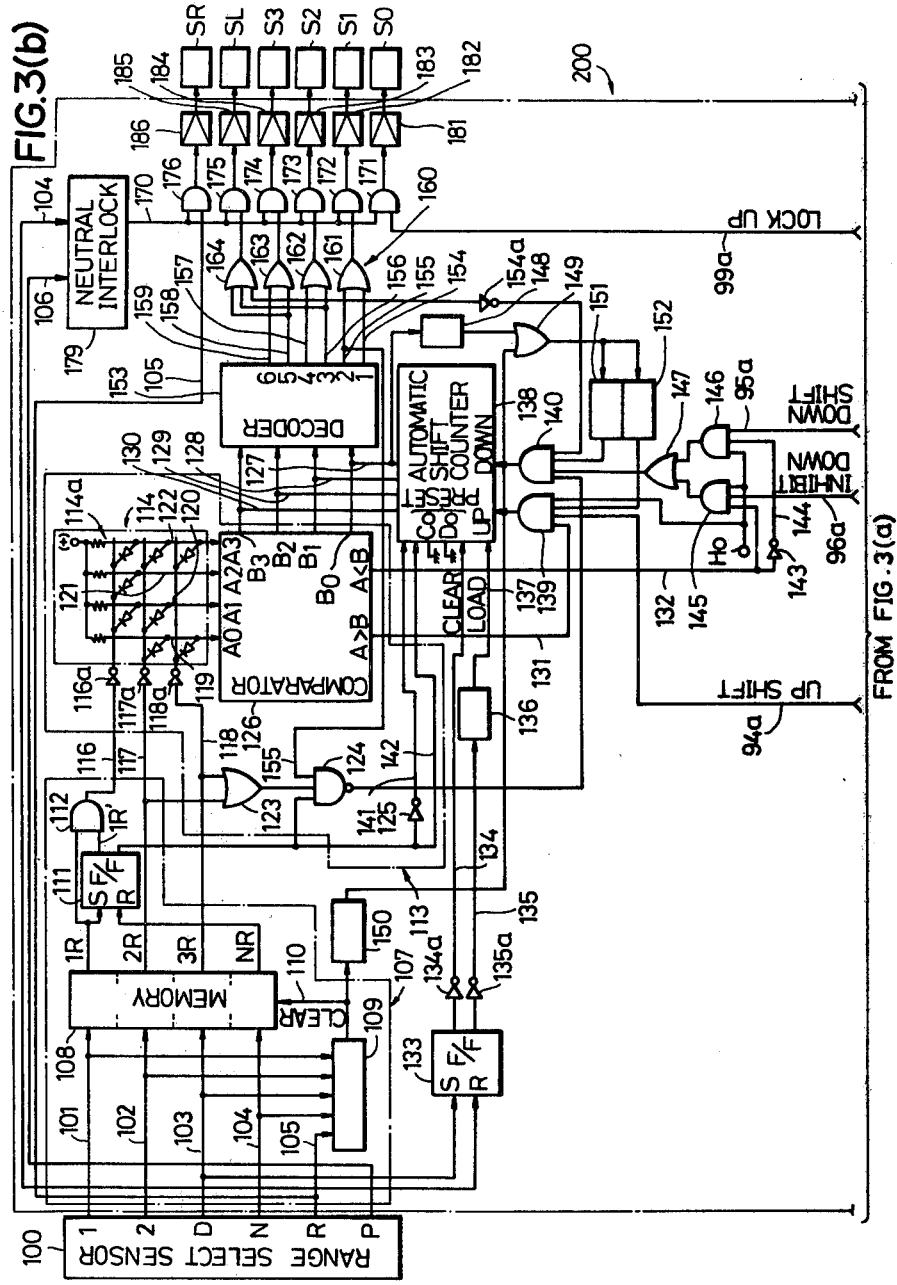

(a) $V_1$
(b) $V_2$
(c) $V_3$

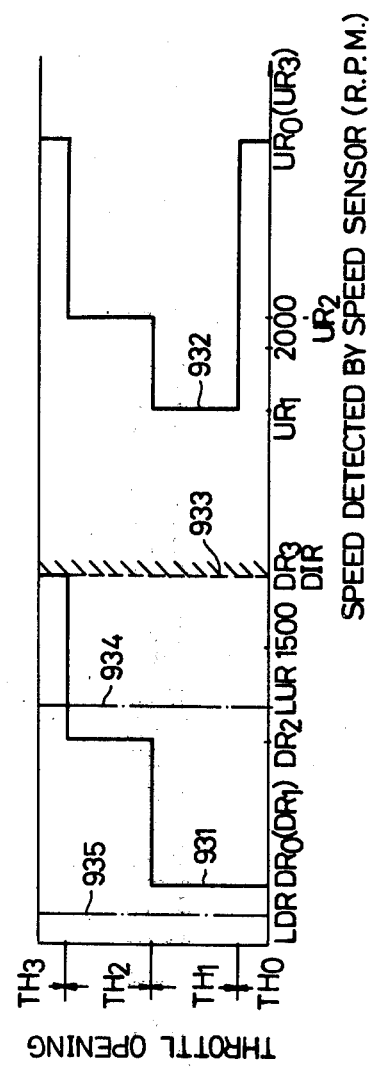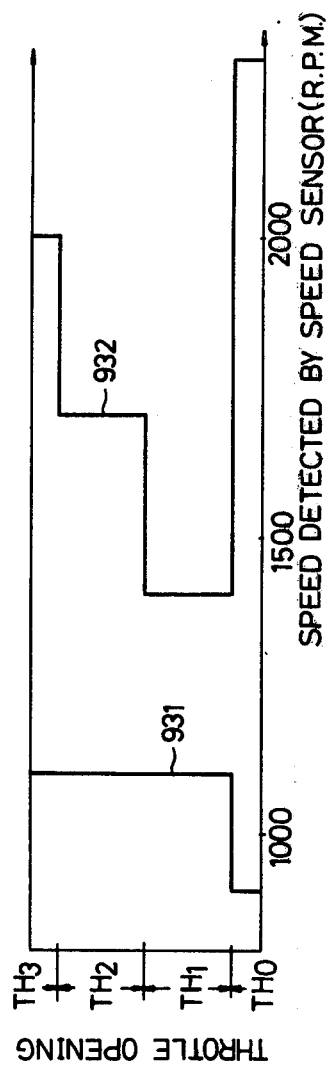

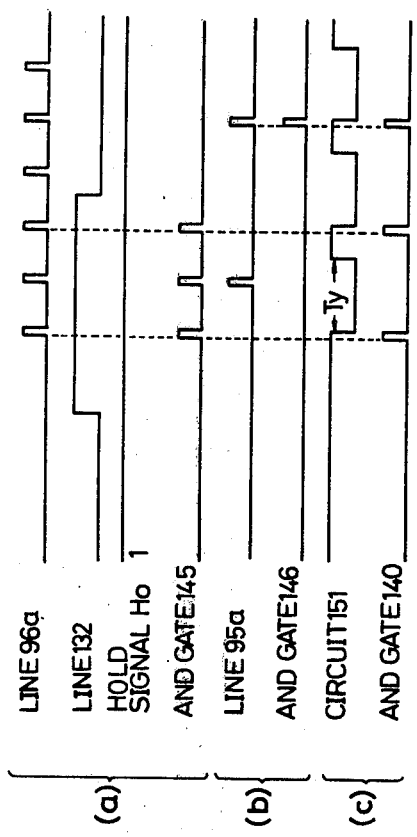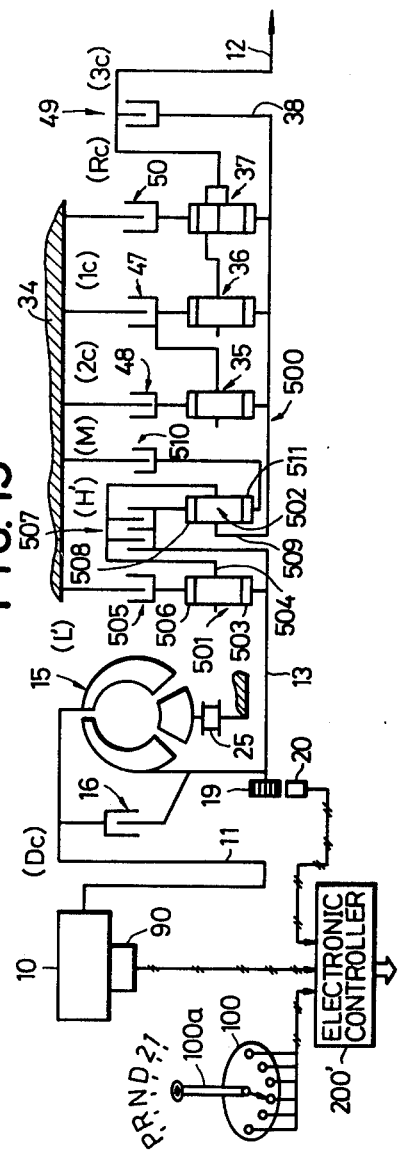

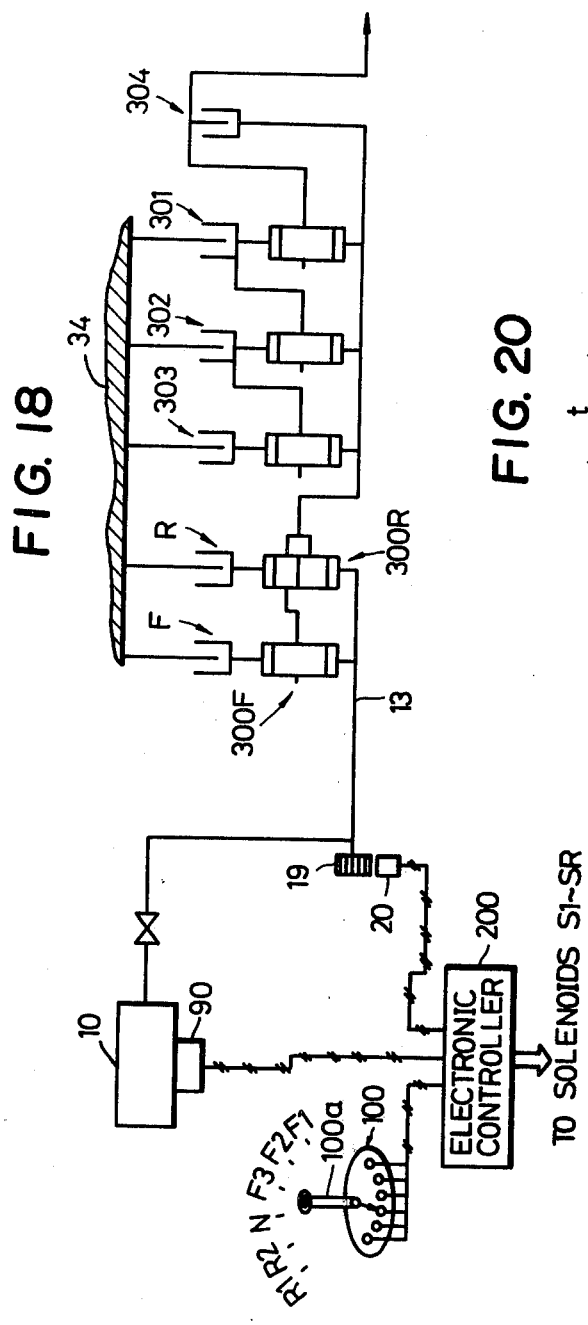
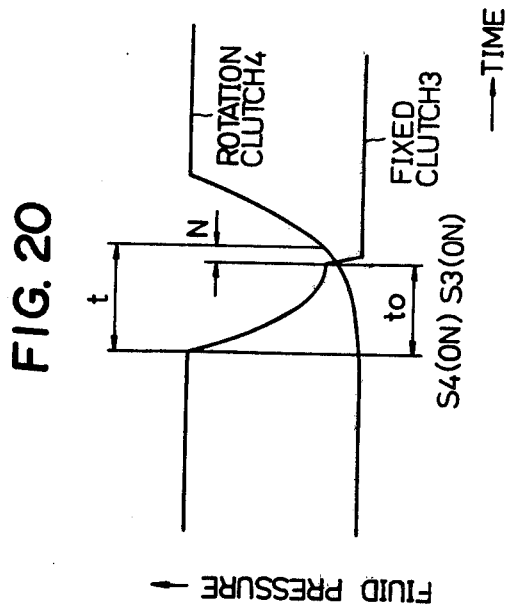

AUTOMATIC SPEED CHANGE CONTROL APPARATUS

BACKGROUND OF THE INVENTION

This invention relates to automatic speed change control apparatus, more particularly to the change of shift modes of electro-fluid pressure type automatic speed change apparatus of a vehicle, especially a civil work car such as a motor scraper or an off-the-road dump truck.

In a motor scraper or an off-the-road dump truck, is used a multi-stage gear transmission system driven by a torque converter provided with a directly coupled clutch, whereas in a bulldozer or the like a direct drive type multi-stage gear transmission system is not provided with a torque converter (this type of transmission system provides a low cost speed changer when it is combined with a gas turbine). The electro-fluid pressure type automatic speed change control apparatus of this invention is applicable to both types of the gear transmission systems described above, and the application thereof to such civil work cars as a motor scraper and bulldozer is extremely advantageous.

Electro-fluid pressure type automatic speed change control apparatus are disclosed in U.S. Pat. Nos. 3,448,640 and 3,572,168 of the titled "Control Apparatus Utilizing Semiconductors" but if such control apparatus are applied to civil work cars, there are the following problems.

More particularly, since in a civil work car the load under operating condition varies rapidly and since the running resistance of the road in the operating field varies greatly, in most cases a multi-stage gear transmission system having six, eight or ten stages is used for the speed changer for transmitting a high torque. However, if an eight stage automatic speed changer designed for a larger load is used on a road manifesting a small running resistance, when the car is operated for the same distance, the cycle time becomes longer thus decreasing the amount of soil carried when compared with a six stage automatic speed changer having the same maximum speed. To obviate this difficulty it has been proposed an eight stage automatic speed changer in which the first stage is manually selected and from the second to the eighth stage the speed is automatically changed. Hereinafter this type of speed changer is termed "eight(8) stage, second to eighth stage (2–8) automatic speed changer". With this construction, when the car is running under a high load or a slope it is necessary to manually select the first stage, which is of course troublesome and inconvenient. This is also true in a six stage automatic speed changer in which the first stage is manually selected and from the second to the sixth stage the speed is changed automatically.

As above described where the automatic speed change is made possible between the first to sixth stages the range of the speed change would be fixed from the first to sixth stage whereas when the automatic speed change is made possible between the second and sixth stage the range of the automatic speed change would be fixed to from the second to sixth stage. Thus, the shift mode of automatic speed change (the range of the speed stage is which automatic speed change is possible) is limited to only one and is not variable. In other words, it is impossible to vary the lower limit of a predetermined range in which automatic speed change is possible (for example, a range from the forward second stage to the forward sixth stage). Thus, for example, when the lower limit of the automatic speed change is the forward second speed, it has been impossible to include the forward first speed in the automatic speed change range. For this reason, when the car is running under a high load or along a slope, it is necessary to perform a troublesome range changing operation such that the control lever is manually returned to the first stage and then set the control lever to the automatic speed change range after the car has accelerated. Furthermore, in the prior art automatic speed change control apparatus disclosed in said U.S. Patents, when the throttle opening is small, the speed changing point is set on the low speed side but when the throttle opening is large the speed changing point is set on the high speed side so as to select an optimum speed stage is accordance with the load of the engine.

For this reason, the shift up speed at the minimum throttle opening is on the low speed side. For example, when the car is running down a steep slope by decreasing the throttle opening and by selecting a low speed stage for applying an engine brake, as the car descends the slope the speed increases so that it is impossible to efficiently utilize the engine brake since the speed stage is automatically shifted up in response to such increase in the engine speed.

For this reason, it is necessary to manually operate the speed change range selecting lever to hold it at a low speed stage each time it becomes necessary to apply the engine brake.

Since civil work cars are subjected to a rapid change in the load or running resistance of the road, in most cases multi-stage gear transmission systems having 6.8 or 10 stages are used for the purpose of transmitting high torques. In an automatic speed changer having such multi-stage gear transmission system, the number of automatic speed changes is also large. However, when the number of the range selection stages for selecting the automatic speed change range is made equal to the number of speed change stages the operator can not immediately judge that which one of the range select stages should be selected. To make easy judgement of the operator, it is advantageous to construct the range selecting lever to use the same pattern of selecting the range as a general passenger car inspite of a large number of speed change stages.

The select lever pattern of a conventional speed change generally follows a shift order of P(parking) - R(reverse) - N(neutral) - D(drive range). Although it is necessary to set the range select stage is accordance with the maximum car speed, the maximum speed of the civil work car is at most 60 km/h so that it is not necessary to provide all speed ranges for each position of the select lever. For this reason, even when the number of the speed change stages is large, the shift pattern may be, for example P-R-N-D-2-1, and the automatic speed change ranges may be D-2-1, wherein 2 corresponds to the second range selection stage (position) and 1 the first range selection stage (position). In such a case, there is a problem that which one of the speed stages of the multi-stage speed changer should be assigned to a limited number of the range selecting stages. Although the maximum speed stage of the multi-stage speed changer is assigned to the driving range D, an intermediate speed selection stage should be determined by considering the relationship between the maximum car speed and the speed reduction ratios between respective speed stages. Accordingly, even if the number of the speed change stages is the same, when the specification (maximum car speed, reduction gear ratio, etc.) of the multi-stage speed changer is changed it is necessary to change the speed stages corresponding to respective range selection stages. However, this requires a large change of the specification of the automatic speed change control apparatus.

It is desirable that the range selecting lever pattern (P-R-N-D-2-1) or the number of the range selection stages described above should be the same regardless of the variation in the number of the speed change stages of the multi-stage automatic speed changer. For example, when the range selecting lever pattern is changed whenever the type of the car is changed, the burden of the operator becomes heavy. Accordingly, the range selection lever pattern should not be changed. For example, let us consider a case in which the mode of the range selecting stage is made to be the same as the above described mode P-R-N-D-2-1 for a forward six stage automatic speed changer and a forward eight stage automatic speed changer. Further, let us assume that the forward six stage automatic speed changer and forward eight stage automatic speed changer are set to the same maximum speed for the drive range D and that the same car speed is set for the second stage of the second-range and the first stage of the first range. Accordingly, in view of the speed reduction ratio of the speed changer, the range select stages of the forward six stage speed changer and the forward eight stage speed changer are different from the actual speed stage. For example, where the drive range select stage D of the forward six stage automatic speed changer is at the forward sixth speed, the second range select stage 2 is at the forward fourth speed and the first range select stage 1 is at the forward first speed, the drive range D of the forward eight stage automatic speed changer will be at the forward eight speed, the second range select stage at the forward fifth stage and the first range select stage at the forward first speed.

In this manner, in a multi-stage speed changer, as the number of the speed change stages varies, the speed stage corresponding to the range select stage becomes different. Accordingly, in an automatic speed change control apparatus, it is necessary to control such that a predetermined speed stage corresponding to the predetermined select stage to be selected will be comensurate with the number of the speed change stages of the multi-stage speed changer to be controlled. For this reason, the construction of the automatic speed change control apparatus will be different when the number of the speed change stages and the maximum speed of the multi-stage speed changer to be controlled vary. However, it causes increase in the manufacturing cost and prevents mass production to make different the construction of the automatic speed change control apparatus for a slight difference in the number of the speed change stages.

In the automatic speed change of a bulldozer or a like civil work car automatic speed change is important during reverse running just like in the forward running so that it is important to set a speed change range (the range of the speed change stages) in response to the load condition during the forward and reverse runnings. For example, it is necessary to set upper and lower limits of the speed range in which automatic speed change is effected so as to select a speed stage suitable for a particular operating condition of the car in accordance with forward soil transportation (running), forward soil pushing (bulldozing), forward heavy digging (ripping), reverse soil preparation (running), reverse running, etc.

SUMMARY OF THE INVENTION

It is an object of this invention to provide automatic speed change control apparatus capable of changing the lower limit of the automatic speed change range thereby freely changing the shift mode.

Another object of this invention is to provide wherein a matrix circuit is used for setting a speed change point in accordance with a throttle opening thereby setting a shift up speed at only a permissible maximum speed when the throttle opening is the minimum.

Still another object of this invention is to provide a novel automatic speed change control apparatus capable of readily changing the speed stages (the maximum speed range of the selected range) to be selected corresponding the respective range select stages thus enabling it to apply the control apparatus to any multi-stage speed changer by a slight modification.

A further object of this invention is to provide an automatic speed change control apparatus capable of determining the upper and lower limits of the range in which the forward or reverse speed is changed.

According to one aspect of this invention, there is provided an automatic speed change control apparatus comprising a throttle position detection circuit for detecting the throttle opening of an internal combustion engine, a shift pattern setting circuit for setting an automatic speed changing point corresponding to the output from the throttle position detection circuit, a speed sensor for detecting a speed of an input shaft of a speed changer, a comparator for comparing the output from the speed sensor and a set value of the shift pattern setting circuit, and a fluid pressure control apparatus responsive to the output from the comparator for controlling a speed changer of the engine whereby the speed changer is controlled in accordance with an automatic speed changing point which is set by the shift pattern setting circuit.

According to another aspect of this invention there is provided an electro-fluid pressure type automatic speed change control apparatus of the type comprising a counter counting a count up pulse or a count down pulse generated in accordance with the running condition of a car, and a speed changer which is operated so as to select a speed stage designated by the content of the counter circuit characterized in that there are provided means for changing a lower limit speed stage for automatic speed change range selected by a range select lever, and a counter control circuit for starting the count up operation of the counter circuit from a first value corresponding to the selected lower limit speed stage and for preventing the contents of the counter circuit from decreasing below the first value at the time of counting down.

According to a further aspect of this invention there is provided an electro-fluid pressure type automatic speed change control apparatus of the type comprising a counter circuit counting a count up or count down pulse generated in accordance with the running condition of a car, and means a speed changer which is operated so as to select a speed stage corresponding to the content of the counter circuit, characterized by a code converting circuit for converting a signal generated corresponding to an operation position of the range select lever into a code signal, a comparator for comparing the output of the code converting circuit with the content of the counter circuit, and a count control circuit which controls the count up or count down operation of said counter circuit in response to the output of said comparator.

In accordance with a further aspect of this invention there is provided an automatic speed change control apparatus of the type wherein a speed stage of a speed changer is controlled within a selected speed change range selected by a range select lever, characterized by comprising a logical circuit which produces a speed change range selection signal utilized for forward and reverse running based on a signal representing the selection of a forward speed change range and a signal representing the selection of a reverse speed change range, and a circuit responsive to the speed change range selection signal for setting the upper and lower limits of a speed change state.

In accordance with still further aspect of this invention there is provided an automatic speed change control apparatus characterized by a throttle position detection circuit for detecting the throttle opening of an internal combustion engine, a shift pattern setting circuit for setting an automatic speed changing point corresponding to the output from said throttle position detection circuit, a speed sensor for detecting a speed of an input shaft of a speed changer, a first comparison circuit for comparing the output from said speed sensor and a set value of said shift pattern setting circuit to produce a pulse, a counter circuit for counting said pulse, a range select lever for selecting either one of a forward running automatic speed change range and a reverse running automatic speed change range, a logical circuit for generating a speed change range selection signal commonly used for both forward and reverse runnings in response to a forward speed change range selection signal or a reverse speed change range selection signal produced in accordance with an operation position of said range select lever, a code converting circuit for converting the speed change range selection signal to a code signal, a second comparison circuit for comparing the output of said code converting circuit with the content of said counter circuit, a first count control circuit which controls the count up or count down operation of said counter circuit in response to the output of said comparator, changing means for changing a lower limit speed stage of the automatic speed change range selected by operation of said range select lever, and a counter control circuit for starting the count up operation of said counter circuit from a first value corresponding to said lower limit speed stage and for preventing the content of said counter circuit from decreasing below said first value at the time of counting down, a speed change mechanism of said apparatus being controlled in such a manner that a speed stage corresponding to content of said counter circuit and a turning direction corresponding to the forward and reverse operation position of said range select lever are selected.

In accordance with still further aspect of the invention, there is provided an automatic speed change control apparatus of a type wherein a speed stage comprising a fixed type clutch and a rotary clutch is controlled by actuation of a shift valve, characterized in said apparatus comprising a shift valve for controlling the fixed type clutch whose ports are so constructed that pressurized fluid are supplied also to a shift valve provided for the rotary clutch when the pressurized fluid is supplied to the fixed type clutch, and a delay circuit for delaying a signal for energizing said shift valve for the fixed type clutch by a predetermined period of time in switching from the fixed type clutch to the rotary clutch.

BRIEF DESCRIPTION OF THE DRAWINGS

In the accompanying drawings:

FIG. 1 is a diagramatic representation showing one embodiment of this invention as applied to a forward 6 stage, reverse 1 stage automatic speed changer, particularly showing the power transmission path of the motion transmission system and the electrical connection between various sensors and an electronic controller;

FIG. 3a and 3b, are bluok diagrams showing the detail of one example of the electronic controller;

FIG. 4 is a block diagram showing one example of the speed sensor shown in FIG. 1;

FIG. 5 is a graph showing one example of the output pulse from the speed sensor shown in FIG. 4;

FIG. 6 shows one example of the throttle sensor shown in FIG. 1;

FIGS. 9 and 10 are graphs showing one example of the shift patterns representing the relationship between the throttle opening and the number of revolutions of the torque converter output shaft;

FIG. 14 is a timing chart showing one example of the operation of a logical gate circuit which applies a count down pulse to the automatic shift counter;

FIG. 15 is a diagrammatic respresentation of a modified embodiment of this invention as applied to a forward eight stage-reverse one stage type automatic speed changer showing the power transmission path of the power transmission system and the electrical connection between various sensors and the electronic controller;

FIG. 17 is a block diagram showing only a portion of the electronic controller shown in FIG. 15 which FIG. 18 is a diagrammatic representation of another embodiment in which the invention has been applied to a forward 4 stage-reverse 4 stage automatic speed change apparatus;

FIG. 20 is a graph showing fluid pressure applied to cylinders of respective clutches at the time of switching from a fixed type clutch to a rotary clutch.

DESCRIPTION OF THE PREFERRED EMBODIMENT

Figure 2:
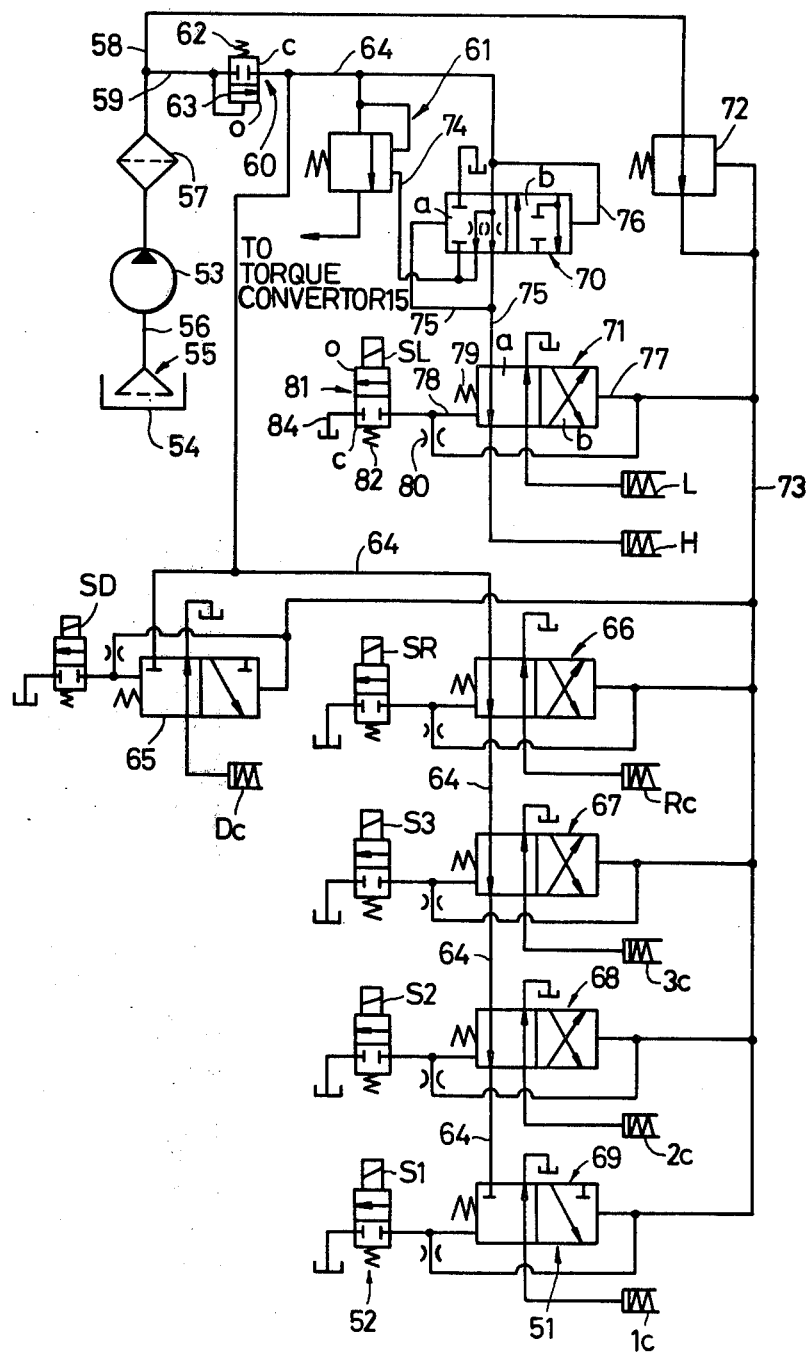
FIG. 2 shows one example of the fluid pressure circuit utilized in the embodiment shown in FIG. 1, particularly showing solenoids controlled by the output of the electronic controller and valves and cylinders for controlling the motion transmission system when the solenoids are energized.

At first an example in which the invention is applied to a forward 6 stage automatic speed changer will be described. FIG. 1 shows a principle of a motion transmission system to which the invention is applicable, and diagrammatically shows a mechanical motion transmission system from an internal combustion engine 10 to the output shaft of a speed changer. The engine 10 drives a torque converter 15 through an engine shaft 11. The torque converter 15 may be of a well known type and comprises a pump impeller wheel 22, a stator 24, a one-way clutch 25 and a trubine blade wheel 23 and a direct coupling clutch 16.

The purpose of the direct coupling clutch 16 is to transmit the engine output directly to the input shaft 13 (the output shaft of the torque converter) of a forward 6-stage reverse 1 stage gear speed changer 21 and constructed to urge a friction member 18 to a clutch plate 17 by operating a clutch cylinder Dc (see FIG. 2) by fluid pressure, thus directly coupling the pump impeller wheel 22 and the turbine blade wheel 23. Reference charactor 26 shows a portion of the torque converter housing.

The output shaft 13 of the torque converter 15 drives a carrier 28 carrying a group of planetary gears 27 for switching between a high speed H and a low speed L. The planetary gear group 27 provides a low speed gear ratio by connecting a sun gear 29 to the output shaft of the torque converter, that is the input shaft 13 of the speed changer, through a clutch 31 and a clutch drum 32. Clutch 31 is engaged by a clutch cylinder L (see FIG. 2). The high speed drive by the planetary gear 27 is performed by fixing the sun gear 29 to the speed changer housing 34 through a disc brake 33 which is engaged by a clutch cylinder H (see FIG. 2). A ring gear 30 drives an intermediate shaft 14 which is connected to sun gears 39, 40 and 41 of the planetary gear groups 35, 36 and 37 and a clutch drum 38. A carrier 42 is connected to the ring gear of the planetary gear group 36, while a carrier 44 is connected to the output shaft 12 of the speed changer through a double planetary gear group 37 for reversal to provide a low speed gear ratio. The clutch cylinder 1c, (see FIG. 2) actuates a disc brake 47 for connecting a carrier 42 and a ring gear 43 to the housing 34 via a disc brake 47. To provide an intermediate gear ratio a clutch cylinder 2c (see FIG. 2) actuates a disc brake 48 for connecting a ring gear 46 to the housing 34 through a disc brake 48. To perform a high speed direct drive, a clutch 49 is engaged by a clutch cylinder 3c for interconnecting the intermediate shaft 14 and the output shaft 12 through clutch 49.

The reverse double planetary gear group 37 provides a reverse gear ratio by connecting a ring gear 45 to a disc brake 50 through a clutch cylinder Rc (FIG. 2). Speed stages comprising forward 6 stages and reverse one stage are provided by selecting a suitable clutch engagement to obtain a number of combinations shown in the following Table 1 by opening clutch cylinders 1c through H corresponding to gear groups described above. Each combination can be obtained by a suitable selection of the clutch engagement. A direct coupling clutch 16 is engaged by automatically operating the clutch cylinder Dc when the speed of a gear 19 mounted on the torque converter output shaft 13 reaches a predetermined speed.

Table 1

| Speed stage | Clutch Cylinder (clutch) | | | | | | |
|---|---|---|---|---|---|---|---|
| | 1c (47) | 2c (48) | 3c (49) | Rc (50) | L (31) | H (33) | Dc (16) |
| reverse | | | | x | x | | Engaged or disengaged in accordance with the set number of revolutions |
| neutral | | | | | | x | |
| forward speed | | | | | | | |
| 1 | x | | | | x | | |
| 2 | x | | | | | x | |
| 3 | | x | | | x | | |
| 4 | | x | | | | x | |
| 5 | | | x | | x | | |
| 6 | | | x | | | x | | x clutch engaged

A Speed sensor 20 is used for the purpose of detecting the revolution speed of a gear wheel 19 provided on the shaft 13. The purpose of a throttle sensor 90 is to detect the output condition of the engine for determining the speed changing point in accordance with the percentage of load of the engine thereby supplying a throttle opening detection signal to an electronic controller 200 in accordance with the throttle opening. A range selecting lever 100a is provided for manually selecting a parking position P, a reverse position R, a neutral position N, a drive range D, a second range selection position 2 or a first range selection position 1, and a range selection sensor 100 is providded corresponding to positions P through 1 of the range selecting lever 100a. The range selection sensor 100 comprises a group of switches corresponding to respective positions P through 1 and interlocked with the lever 100a and are connected to apply signals to an electronic controller 200.

In response to the signals from the three elements described above (sensors 20, 90 and 100), the electronic controller 200 provides an automatic shift control of various solenoids $S_1$ through $S_D$ shown in FIG. 2. The construction and operation of the electronic controller 200 will be described later with reference to FIGS. 3a and 3b.

Clutch cylinders 1c through Dc are operated by pilot operating shift valve groups 51 by selector valve groups 52. The selector valves are operated by solenoids $S_1$, $S_2$, $S_3$, $S_R$, $S_L$ and $S_D$ respectively and the relationship between respective speed stages and solenoids $S_1$ through $S_D$ is shown in Table 2.

Table 2

| speed stage | Solenoid | | | | | |
|---|---|---|---|---|---|---|
| | $S_1$ | $S_2$ | $S_3$ | $S_R$ | $S_L$ | $S_D$ |
| reverse | | | | x | x | energized or deenergized according to the set number of revolutions |
| neutral | | | | | | |
| forward speed | | | | | x | |
| 1 | x | | | | | |
| 2 | x | | | | | |
| 3 | | x | | | x | |
| 4 | | x | | | | |
| 5 | | | x | | x | |
| 6 | | | x | | | | x energized state.

A driving pump 53 shown in FIG. 2 is coupled to the engine 10 through a gearing, not shown, for sucking fluid contained in a reservoir 54 through a suction pipe 56 provided with a strainer 55. Pressurized fluid is supplied to a shut-off valve 60 from pump 53 through a filter 57, a conduit 58 and a branch conduit 59.

The purpose of the shut-off valve 60 is to compensate for the pressure drop in the conduit which occurs when the output of the pump 53 decreases during idling of the engine 10 and to prevent a shock at the time of speed change. By the action of a modulation relief valve 61, the pressure decrease in the conduit 58 is prevented for preventing any disturbance of the shift value groups 51. The shut-off valve 60 is provided with a coil spring 62 which normally urges a spool 63 toward the closed position when the pressure in the conduit 59 decreases below a set value and the spool 63 is urged to the closed position by the force of the coil spring 62. (The same is true when the pressure in the conduit 64 decreases). However, when the pump 53 is rotating at a normal speed, the pressure in conduit 59 is above the set pressure so that the spool 63 is moved from closed position C to open position O against the force of spring 62 thus passing fluid from conduit 59 into conduit 64. The pressurized fluid in conduit 64 is utilized to operate clutch cylinders 1c, 2c, 3c, Rc, Dc, L and H. Normally, the fluid in conduit 64 is relieved by a modulation relief valve 61 and serves as a fluid source for driving the torque converter 15. The fluid in the conduit 64 is supplied to a high speed directly coupled drive shift valve 67, an intermediate speed clutch shift valve 68 and a low speed clutch shift valve 69 through a directly coupled clutch transfer valve 65 and a reverse clutch shift valve 66. The fluid in the conduit 64 is also supplied to a shift speed (H)—low speed (L) clutch shift valve 71 through a timing pressure valve 70 thereby selectively supplying the fluid to clutch cylinders H or L.

As diagrammatically shown, the timing pressure valve 70 comprises a valve having an orifice, and when the H/L clutch shift valve 71 operates the valves 70 is switched from position a to position b by using the pressure difference between the input pressure 76 and the output pressure 75 for draining a vent 76 of the modulation relief valve 61 thus decreasing the pressure in conduit 64. Accordingly, when the pressure difference between the input pressure 76 and the output pressure 75 decreases the valve is returned to position a thus gradually increasing the pressure in the vent circuit 74. This causes a gradual increase in the pressure in the conduit 64 thereby minimizing the torque variation during clutch engaging and preventing shift shock.

The pressure of the fluid in the conduit 58 on the output side of the pump is reduced to a constant value by a reducing valve 72 and sets a reference pressure which is applied to the shift valve group 51 for selectively switching respective clutches. The control of the shift valves is the same so that the switching operating of the H/L valve 71 will be described in the following as an example.

The valve 71 has two positions a and b and its spool is normally urged to position a by a spring 79 since its solenoid SL is not normally energized. Accordingly, when the solenoid SL is not energized the clutch cylinder H is actuated. The fluid at the reference pressure in conduit 73 is supplied to the pressure chamber 77 of valve 71. The reference pressure fluid is also supplied to conduit 78 through an orifice 80. The fluid in conduit 78 is also supplied to a selector valve 81. The selector valve 81 comprises an one-way electromagnetic valve having two positions C and O and when the solenoid coil SL is not energized, the valve 81 is maintained at the closed position on C by the force of spring 82. When the solenoid coil SL is energized the valve 81 is switched to the opened position O to drain the fluid in conduit 78 through a path 84. Since the fluid is throttled by the orifice 80 the pressure in the conduit 78 is low so that the spool of valve 71 will be shifted to position b by the reference pressure in conduit 77 against the force of a spring 79 thus draining the fluid in the clutch cylinder H. At the same time, the fluid in conduit 75 is supplied to the clutch cylinder L thus power shifting the speed changer 21. Other clutch cylinders 1c, 2c, 3c, Rc and Dc are similarly operated by the energization of the solenoids $S_1$, $S_2$, $S_3$, $S_R$ and $S_D$ respectively, thereby selecting $\mu$ redetermined speed stages shown in Tables 1 and 2.

FIGS. 3a and 3b when conbined, show one embodiment of the electronic controller 200 of the electro-oil pressure type automatic speed change control system of this invention. For the purpose of preparing the drawing the electronic controller 200 is divided in two parts, FIGS. 3a and 3b. Although an electric source circuit is not shown, it should be understood that a reference voltage (Dc 12 V) is supplied to various circuit from a DC 24 V car mounted battery through a constant voltage circuit.

As shown in FIG. 4, the speed sensor 20 in a electronic circuit comprising a high frequency oscillator 201 including a pick-up coil, a detector 203 connected to the output line 202 of the oscillator 201, and a rectangular wave shaper gate circuit 205 connected to the output of the detector 203 through a line 204. The speed sensor 20 produces on a line 206 pulses of the same number as that of the teeth of the gear 19 as the teeth approach the sensor. The pulses have waveforms as shown in FIG. 5. Thus, the speed sensor 20 produces a rectangular waveform pulse signal having a frequency proportional to the number of revolutions of the torque converter output shaft 13, and the pulse signal is applied to a speed comparator 92 (see FIG. 3a) through line 206.

As shown in FIG. 6, the throttle sensor 90 comprises a multi-contact switch. The switch is contructed to selectively engage a movable contact 90e carried by a movable member 90f with stationary contacts pa, pb, pc and pd, the movable member 90f being moved in accordance with the degree of opening of the throttle valve of the engine. The stationary contacts pa, pb, pc and pd are grounded and since output lines 90a, 90b, 90c and 90d are supplied with a positive voltage (+12 V) through diodes Do and resistor $R_o$ (see FIG. 7) as will be described later, when one of the stationary contacts 90a through 90d is engaged by the movable contact 90e a low level signal is provided on one of the output lines 90a through 90d corresponding to the degree of opening of the throttle valve. For example, when the degree of opening of the throttle valve is zero (idle) a signal is produced on line 90a, and when the throttle opening is slightly larger than the idle opening a signal is produced on line 90b. Between one half throttle opening and the full throttle opening a signal is produced on line 90c whereas at the maximum throttle opening (detent) above the full opening, a signal is produced on line 90d. The output from the throttle sensor 90 is applied to a throttle position detector 91.

The throttle position detector 91 comprises a latch circuit that latches the signals from input lines 90a through 90d, and a pulse generating circuit for releasing the latch circuit and operates to produce signals corresponding to the throttle opening on lines $TH_0$ through $TH_3$ in response to the signals on input lines 90a through 90d.

Figure 7:
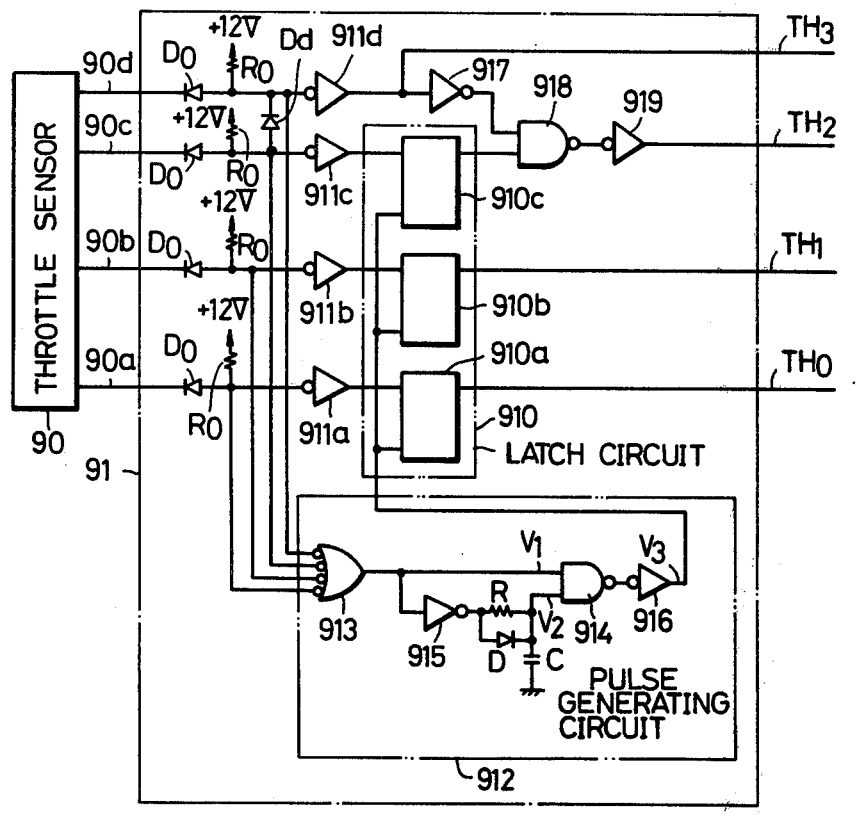
FIG. 7 is convection diagram showing the detail of the throttle position detector.

FIG. 7 shows the detail of one example of the throttle position detector 91. The latch circuit 910 is constituted by low latches 910a, 910b and 910c which operate to invert the low level signals on the input lines 90a. 90b and 90c by inverters 911a, 911b and 911c and temporary store the inverted signals.

Figure 8:
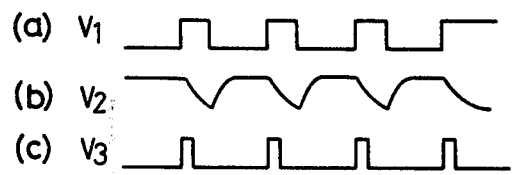
FIG. 8a, 8b and 8c are graphs showing one examples of the signals $V_1$, $V_2$ and $V_3$ shown in FIG. 7.

A pulse generating circuit 912 generates a pulse signal that releases the memory of the latch circuit 910. The signal on one of the input lines 90a through 90d in applied to one input of a NAND gate circuit 914 through a NOR gate circuit 913. This signal is designated by $V_1$. As shown in FIG. 8a, the signal $V_1$ is a pulse signal which is at a low level when there is no signal on input lines 90a through 90d (all at high levels) but builds up to a high level when a signal appears on any one of the input lines 90a through 90d (that is becomes low level).

The output signal $V_1$ from the NOR gate circuit 913 is applied to the other input of the NAND gate circuit 914 through an inverter 915 and a RC circuit including a resistor R and a capacitor C. This signal is designated by $V_2$. As shown in FIG. 8b, signal $V_2$ is at a high level when signal $V_1$ is at a low level. When signal $V_1$ builds up signal $V_2$ becomes a low level as the capacitor C discharges. A diode D is connected in parallel with resistor R for preventing signal $V_1$ from being affected by potential of capacitor C from affecting signal $V_1$. The output of the NAND gate circuit 914 is taken out through an inverter 916 to be used as the output signal from the pulse generating circuit 912. This signal is designated by $V_3$. As shown in FIG. 8c, signal $V_3$ is a pulse signal which is produced when signal $V_1$ builds up.

As above described, an "1" pulse is produced by the pulse generating circuit each time a signal appears on any one of the lines 90a through 90d.

The pulse signal from the pulse generating circuit 912 is applied to latches 910a, 910b and 910c of the latch circuit 910 to release the memories of respective latches and to store new signals appearing on lines 90a through 90c in corresponding latches.

In this manner, each time when the degree of throttle opening varies the memory in the latch circuit is renewed.

The signal on the output line 90d corresponding to the maximum throttle opening (detent) is not stored in the latch circuit 910 but instead applied directly to the speed comparator 92 through an inverter 911d as a throttle signal $TH_3$.

The signal on line 90d also is applied to one input of NAND gate circuit 918 via inverters 911d and 917. The other input of the NAND gate circuit 918 is connected to receive the output of the latch 910c which stores the signal on line 90c corresponding to the throttle opening under the maximum opening, that is form one half opening to full opening.

As shown in FIG. 7, lines 90c and 90d are interconnected through a diode Dd so that a low level signal is produced on line 90d at the maximum throttle opening with the result that the signal on line 90c also becomes low level through the diode Dd. As a consequence, the memory of the latch 910c would not be released.

Accordingly, the output from the NAND gate circuit 918 is maintained at "1" by the action of inverter 917 when the throttle signal $TH_3$ is present, but when the output from the throttle sensor 90 switched to line 90c from line 90d the outout of the NAND gate circuit 918 immediately becomes a low level. This output of the NAND gate circuit 918 is inverted by an inverter 919 and then applied to comparator 92 as a throttle signal $TH_2$.

The reason for providing latches that store signals from the throttle sensor 90 corresponding to respective lines 90a through 90c while leaving the signal on line 90d appearing thereon at the maximum throttle opening (detent) unlatched thereby producing throttle signal $TH_3$ and producing the throttle signal $TH_3$ only at the maximum throttle opening by using diode Dd and NAND gate circuit 916, lines in the prevention of hysteresis of the throttle signal caused by the opening and closing of the throttle valve.

The outputs from latches 910a and 910b that have stored signals on the output lines 90a and 90b of the throttle sensor 90 are applied to speed comparator 92 to act as throttle signals $TH_0$ and $TH_1$ respectively. The latch circuit 910 may be made of such integrated circuit as type SLL 4042A sold by solid state Scientific Co. and type CD 4042A sold by Radio Corporation of America.

The speed comparator 92 comprises a 8 bit binary counter 920, a shift up comparator 921, a shift down comparator 922 a shift down inhibit comparator 923, a torque converter lock up release comparator 924, a torque converter lock up comparator 925, a diode matrix 926 which is applied with throttle signals $TH_0$ through $TH_3$ for encoding them into binary data corresponding to a predetermined set speed, a diode matrix 927 for applying to comparator 923 through 925 reference data corresponding to the set speed, and a bias resistor group 928 for the diode matrix 927. As the binary counter 920 may be used an integrated circuit such as type SCL 4585A sold by solid state Scientific Co. Each of the comparators 921 through 925 may be formed by cascade connecting 4 bit magnitude comparators of the type MC 14585A sold by Motoroller Co. into a 8 bit comparator.

The clock pulse generator 93 periodically applies a reset pulse to the counter 920. Accordingly the spacing of the reset pulses constitutes the reference counting time of the counter 920 during which the number of pulses supplied from the speed sensor 20 is counted by the counter 920. The output from the counter 920 constitutes one input A to respective comparators 921 through 925. The other inputs B of the shift up comparator 921 and the shift down comparator 922 are connected to receive the values preset by the diode matrix 926 when throttle signals $TH_0$ through $TH_3$ are produced. Also the when inputs B of the comparators 923 through 925 receive signals preset by the diode matrix 927.

The counter 920 produces a shift up pulse or a shift down pulse according to a shift pattern as shown in FIG. 9 and representing the relationship between the speed of the speed changer input shaft 13 (the speed detected by the speed sensor) and the engine throttle opening as well as a shift down inhibit pulse, a torque converter lock up signal and a torque converter lock up release signal. In FIG. 9, line 931 shows a shift down line, line 932 a shift up line, line 933 a shift down inhibit line, line 934 a torque converter lock up line, and line 935 a torque converter lock up release line. The diode matrix 926 operates to encode input throttle signals $TH_0$ through $TH_3$ into signals corresponding to predetermined set speeds in accordance with a shift pattern formed by the lines 931 and 932 shown in FIG. 9 and applies the encoded signals to comparators 921 and 922. The diode matrix 927 is constructed to apply to the comparators 923, 924 and 925 signals respectively corresponding to the set speeds shown by lines 933, 934 and 935 shown in FIG. 9.

More particularly, the diode matrix 926 operates to set a shift down speed $DR_0$ and shift up speed $UR_0$ when the throttle signal $TH_0$ presents (that is when it is "1"), to set a shift down speed $DR_1$ and a shift up speed $UR_1$ when the throttle signal $TH_1$ presents, to set a shift down speed $DR_2$ and a shift up speed $UR_2$ when the throttle signal $TH_2$ presents, and to set a shift down speed $DR_3$ and a shift up speed $UR_3$ when the throttle signal $TH_3$ presents.

On the other hand, the diode matrix 927 operates to set a shift down inhibit speed DIR, a torque converter lock up speed LUR and a torque converter lock up release speed LDR.

The automatic speed changer of this invention selects a speed stage according to the shift pattern shown in FIG. 9. This operation will be described briefly as follows.

When the range selection lever 160a is maintained at the neutral position N and when the acceleration pedal (not shown) of the car is not depressed, the throttle opening is at the idle position and the throttle signal $TH_0$ is being produced.

When the range selection lever 100a is switched to drive position D, a converter drive condition for the forward second speed is established. (In this example, it is constructed that the speed stage is selected starting from the forward second speed as will be described later)

When the throttle valve is opened by depressing the acceleration pedal and when the speed of the torque converter output shaft 13 reaches the torque converter lock up speed LUR which has been set as above described, the torque converter is locked up thereby establishing a direct driving state in which the engine output is directly applied to the speed changer.

Under the direct driving stage, when the engine speed decreases to the torque converter lock up release speed LDR, the direct coupling clutch 16 is disengaged thus turning to the torque converter drive state, with the results that a high torque is generated to prevent an engine stop.

When the throttle valve is opened to an extent in which the throttle signal $TH_1$ is generated and when the load of the engine is low so that the speed detected by the speed sensor 20 reaches the shift up speed $UR_1$, a shift up is effected (from forward second speed to forward third speed) On the contrary, when the engine output torque decreases owing to the increase in the load a shift down is effected (from the forward third speed to the forward second speed).

In the presence of the throttle signal $TH_2$, the shift up and shift down speeds are shifted to higher speeds $UR_2$ and $DR_2$, respectively, and under the maximum throttle opening state (detent) in which the throttle signal $TH_3$ is produced, the shift up and shift down speed are shifted to much higher speeds $UR_3$ and $DR_3$ respectively. When the speed detected by the speed sensor 20 reaches the shift up speed $UR_3$, a shift up is effected whereas when the speed decreases to the shift down speed $DR_3$, a shift down is effected.

These shift up and shift down controls are effected similarly up to the forward sixth speed.

In the automatic speed control system of this invention, the shift up speed $UR_0$ at the idle position of the throttle opening, that is, when the throttle signal $TH_0$ is produced, is set to be higher than the high idle speed.

Accordingly, when the throttle opening is at the idle state, the engine speed is not generally shifted up but shifted up only when the engine speed becomes excessive for the purpose of protecting the engine.

Consequently, so long as the throttle opening is maintained at a minimum opening (idle) even when the speed increases under low load as in a car descending a slope or a vehicle pushed by a pusher such as a motor scraper, the speed would not be increased up to the set high speed $UR_0$ thereby automatically holding the low speed stage.

FIG. 10 shows one example of a shift pattern applicable to such vehicle as a bulldozer which is not equipped with a torque converter. In this embodiment too, as shift up speed is set to a high value when the throttle opening is at the idle state and the throttle signal $TH_0$ is produced, a low speed stage would be held automatically when the throttle opening is minimum (idle).

Referring again to FIG. 3a, the outputs from comparators 921 through 925 are applied to one inputs of AND gate circuits 94 through 98. While the other inputs of these AND gate circuits are connected to receive a reset pulse from the clock pulse generator 93 through a line 930. Consequently, shift pulses are produced by respective comparators 921 through 925 via respective AND gate circuit 94 through 98 in synchronism with the reference counting time of the counter 920.

As above described, since the comparison of the speed is made by the speed comparator 92 at each reference time of the counter 920, the count of the input pulses performed by the counter 920 is averaged during the reference time thus decreasing the sensitivity to irregular speeds.

The shift up comparator 921 produces an output when the present speed input A from the counter 920 exceeds the set input B from the diode matrix 926 ($A \geq B$). This output is applied to a line 94a via the AND gate circuit 94 to act as the shift up pulse. The shift down comparator 922 produces an output when the present speed input A from the counter 920 exceeds the set input B from the diode matrix 926 ($A \leq B$) and this input is applied to a line 95a through the AND gate circuit 95 to act as the shift down pulse. The shift down inhibit comparator 923 produces an "1" output when the present speed input A is smaller than a set value B shown by the line 933 and set by the diode matrix 927 ($A \leq B$) and this output is applied to line 96a via the AND gate circuit 96 to act as the shift down inhibit signal. When the signal on line 96a is "0" the forced shift down described later is prohibited.

The torque converter lock up comparator 925 produces an ($A \geq B$) output when the present speed A becomes larger than the set speed B shown by line 934 for setting a flip-flop circuit 99 via an AND gate circuit 98. Then the signal on line 99a becomes "1" acting as a lock up command signal. The lock up release comparator 924 produces an ($A \leq B$) signal when the present speed A becomes smaller than the set speed B shown by line 935, for resetting flip-flop circuit 99 via AND gate circuit 97 thereby releasing lock up command of line 99a.

Lines 94a through 99a shown in FIG. 3a are connected to the same lines shown in FIGS. 3b.

Figure 11:
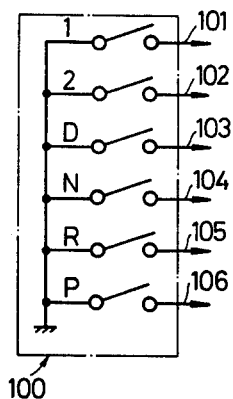
FIG. 11 is a connection diagram showing one example of a range selection sensor shown in FIG. 1.

A range selecting sensor 100 comprises a group of switches operated by the selecting lever 100a and its construction is shown in FIG. 11. The contacts of the switches corresponds to respective positions of the selecting bar, that is a parking position P, a reverse position R, a neutral position N, a drive range position D, a second range selecting position 2, and a first range selecting position 1. In an automatic speed change range, the selecting bar 100a is operated to turn ON and OFF the switches at the drive range position D or as the range selecting positions 1 and 2 for selecting a selected range thus setting the upper range for shift up. Signal lines 101 through 105 connected to respective switches lead to as detecting circuit 107.

The range selecting detection circuit 107 utilizes a memory circuit 108 termed a D latch for the purpose of preventing misoperation caused by the chattering of the input signal. Advantageously, the memory circuit 108 may be formed by an integrated circuit of type SCL 4042A or type CD4042A having the same construction as the latch circuits 91a, 91b and 91c. In response to the variation in the signals on lines 101 through 105, a differentiated pulse generating circuit 109 produces a pulse which is applied to reset a latch in the memory circuit 105 through line 110. For example, when the range selecting command signal is shifted from position 1 (the first range selecting stage) to position 2 (the second range selecting stage) the memory circuit 108 is reset only when it receives the signal on line 102 to store the signal thereby producing a range selecting command signal 2R of position 2. In other words the circuit is constructed such that when the selecting lever 100a is moved to position 2 from position 1, the range selecting command signal hold the signal 1R of position 1 between the turning OFF of the detecting switch at position 1 shown in FIG. 11 and the turning ON of the detecting switch for position 2. As a consequence, the range selecting command signal from the memory circuit 108 will not be interrupted while the lever 100a is being moved.

A flip-flop circuit 111 is used as a memory device in changing the shift mode in automatic speed change. The range selecting command 1R corresponding to the first range selecting position 1 of the selecting lever 100a is applied to the set terminal of the flip-flop circuit 111 and the neutral command signal NR corresponding to the neutral position N is used as the reset input.

When the selecting lever 100a is set at the neutral position N the neutral command signal NR generated by the memory circuit 108 is an "1" signal thus resetting the flip flop circuit 111. Accordingly the reset. output of the flip-flop circuit 111 is "1" the signal on line 142 is "1" and the signal on line 141 through inverter 125 is "0". Signals on lines 141 and 142 are used as the preset data input to a automatic shift counter 138, which stores a preset data of binary "10" or decimal [2] when the signal on line 141 is "0" and the signal on line 142 is "1". When the signal on line 141 is "1" and the signal 142 is "0" the preset data is binary "01", that is decimal [1]. This is shown in the following Table 3.

Table 3

| binary input | | preset data of counter 138 |
|---|---|---|
| line 142 | line 141 | decimal |
| 0 | 1 | 1 |
| 1 | 0 | 2 |

Consequently, when the flip-flop circuit 111 is not set (reset) the preset data in the automatic shift counter 138 is a decimal [2].

When the range selecting lever 100a is brought to the first range select position 1, the flip flop circuit 111 is set by the range selecting command signal 1R so that the signal on line 142 becomes "0" and the signal on line 141 becomes "1". The set state of the flip-flop circuit 111 is maintained unless the lever 100a is not moved to position N even though it has moved to position 2 or D. Consequently, under the set state, the preset data in the automatic shift counter 138 is a decimal 1.

A reversible counter having a preset input is utilized as the automatic shift counter 138. As the reversible counter may be used an integrated circuit, for example type HD74193 sold by Harris Co. The content of the counter is preset by the preset data from lines 141 and 142 and the content of the counter is produced on out lines 127, 128, 129 and 130 comprising binary 4 bits. The content of the counter 138 corresponds to the speed stage designated for the multistage speed changer 21 (FIG.) as will be described later. Accordingly, when the automatic shift counter is preset to a decimal 1, the data on its binary output lines 127 through 130 designates the "forward first speed". When the counter 138 is preset to a decimal 2, the data on its binary output lines 127 through 130 designates the "forward second speed".

Consequently, when the range selecting lever 100a is moved to the drive range D or the second range selecting position D from the neutral position N at start, the forward second speed command is produced by the counter 138 because the flip-flop circuit 111 is not set. In this manner, when the lever 100a is operated without passing through the first range selection position 1 (the operation of the order of N→D or N→D→2 or N→D→2→D) an automatic speed change is commenced from the forward second speed meaning that a shift mode has been selected in which an automatic speed change is effected between the forward second speed and the forward fourth speed or between the forward second speed and the forward sixth speed as will be described later.

When the range selecting lever 100a is moved to the first range selecting position 1 from the neutral position N, the flip-flop circuit 111 is set so that counter 138 produces the forward first speed command signal. In this manner, when the lever 100a is moved passing through the first range selecting position 1 (the operation in the order of N→1, or N→1→D or N→1→2) automatic speed change is effected starting from the forward first speed, thereby selecting a shift mode in which automatic speed change is effected between the forward first speed and the forward fourth speed or between the forward first speed and the forward sixth speed.

As above described, the shift mode can be changed by a single operation of the lever passing through the first range selecting position 1.

Instead of using the range selecting commands 1R and NR as the inputs to the flip-flop circuit 111, an independent shift mode selection switch (not shown) may be provided for setting and resetting the flip-flop circuit 111 by the signals produced by the switch. Although, in the foregoing description the shift mode was changed starting from the forward first speed or the second speed, it should be understood that the invention is not limited to such specific shift modes. Further, in this example, only two selectable shift modes were described, the number of the shift modes may be increased, if desired. In such case a memory circuit such as a flip-flop flop circuit or a register is combined with a suitable logic circuit for forming preset data necessary for the automatic shift counter 138. The range selecting command signal 2R corresponding to the second range selecting position 2 and the range selecting command signal 3R corresponding to the drive range D which are produced by the memory circuit 108 are applied to one input of a NAND gate circuit 124 via OR gate circuit 123. The other one input of the NAND gate circuit 124 is connected to receive the reset output of the flip-flop circuit 111 and an output produced by a decoder 153 (to be described later) on a line 155 and corresponding to the forward second speed. As just described, when the flip-flop circuit 111 is not set "a forward second speed shift mode" is selected in which case when the forward second speed stage is reached, the signal on line 155 becomes "1" so that the output from the NAND gate circuit 124 becomes "0".

Since the output from the NAND gate circuit 124 is applied to one input of an AND gate circuit 140 which supplies a down pulse to the automatic shift counter 138, the AND gate circuit 140 is disenabled so that the output of the NAND gate circuit 124 becomes "0" thus extinguishing the "down pulse" when the "forward second speed shift mode" is selected and when the speed changer 21 reaches the forward second speed stage as commanded by the output of decoder 153, further shift down is not effected whereby the minimum speed stage is limited to the forward second speed.

As above described when the lever 100a is operated through the first range selecting position 1, since the flip-flop circuit 111 has been set, the NAND gate circuit 124 produces an "1" output so that it is possible to shift down automatically to the forward first speed. In this manner, in the case of the "forward first speed shift mode" the minimum speed step is also the forward first speed.

The upper limit of the automatic shift up is determined by the present position of the range selecting lever 100a.

The range select command signal 1R and the set output 1R' from the flip-flop circuit 111 are applied to the inputs of the AND gate circuit 112, and its output appearing on line 116 is applied to a diode matrix 114 of a range selecting circuit 113. The range selecting command signal 2R is also applied to the diode matrix 114 via line 117, and the range select command signal 3R which is produced by the memory circuit 108 when the lever 100a is set at the drive range D is applied to the diode matrix 114 via line 118. In the diode matrix 114, the upper limit of the speed stage of the automatic speed changing, that is the range selecting stage is set corresponding to the position of the lever 100a. In the case wherein the automatic speed changer has six stages as in this example, at the first range selecting position 1 of the lever 100a, the forward first speed is the upper limit, at the second range selecting position 2, the forward fourth speed is the upper limit, and at the drive range D, the forward sixth speed is the upper limit. The diodes of the matrix circuits are connected to produce encoded outputs as shown in the following table 4 in response to the range selecting command signal 1R on line 116, the range selecting command signal 2R on line 117 and the range selecting command signal 3R on line 118. More particularly, the diode matrix 114 produces binary codes corresponding to the range select maximum speed stages $F_1$ (forward first speed), $F_4$ (forward fourth speed) and $F_6$ (forward sixth speed) respectively corresponding to command signals 1R, 2R and 3R.

Table 4

| position of lever 100a | max. speed stage | diode matrix $A_0$ $A_1$ $A_2$ $A_3$ |
|---|---|---|
| D(3R) | $F_6$ | 0  1  1  0 |
| 2(2R) | $F_4$ | 0  0  1  0 |
| 1(1R) | $F_1$ | 1  0  0  0 |

Remark
0 ... there is a diode
1 ... there is no diode

In the construction shown in FIG. 3, the cathode electrodes of respective diodes are connected to lines 116, 117 and 118, and a positive potential is inpressed on the diode matrix 114 via a pull-up resistor 114a, so that inverters 116a, 117a and 118a are inserted in series with respective lines 116, 117 and 118. However, instead of providing inverters, the resistor 114a may be grounded in which case diodes are provided at the positions of "1" in Table 4.

The binary codes $A_0$, $A_1$, $A_2$, $A_3$ (A) produced by the diode matrix 114 are applied to a comparatory 126 to be compared with the binary codes $B_0$, $B_1$, $B_2$ and $B_3$ (B) representing the present speed stage of the speed changer 21 and applied from the automatic shift counter 138. where the input A from the diode matrix 114 is larger than the input B from the counter 138, the comparator 126 produces a signal "1" on output line 131. The "1" signal on line 131 means that the presetn speed stage B is lower than the upper limit speed stage A set by the range selecting lever 100a and this "1" signal is applied to AND gate circuit 139 so that when the other condition therefor in satisfied, an "up pulse" can be produced. When input A is smaller than input B signal "1" is produced on output line 132. This means that the present speed stage B is higher than the upper speed stage A set by the lever 100a so that the "1" signal on line 132 is applied to AND gate circuit 145 thus requesting a "forced shift down". This signal on line 132 is inverted by inverter 143 and then applied to the AND gate circuit 146 via line 144 thus enabling the AND gate circuit 146 under a condition of not effecting the "forced shift down" thus giving a "shift down pulse" in response to a signal from line 95a.

A four bit comparator integrated circuit of the MC 14585 series sold by Motorola Co, for example may be used as the comparator 126.

Figure 12:
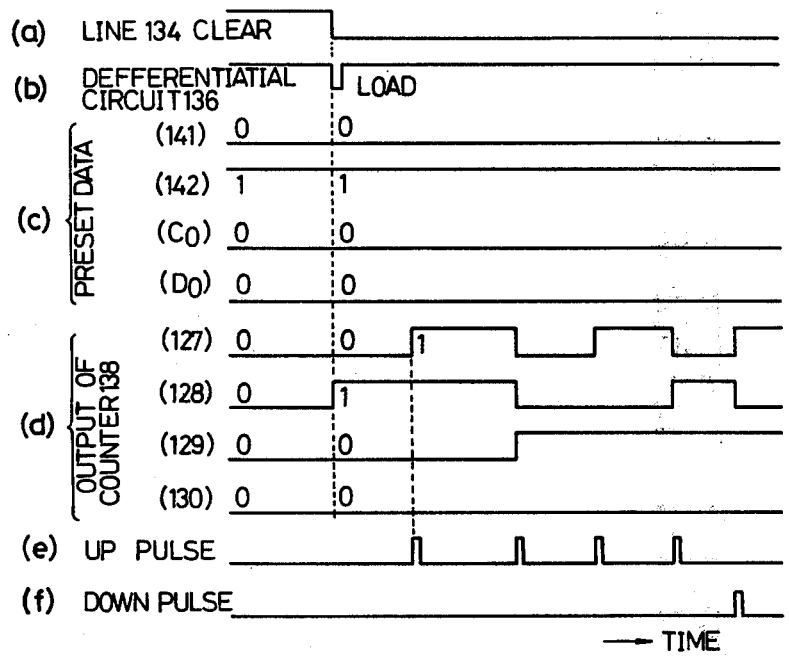
FIG. 12 is a timing chart showing one examples of the input and output signals of the automatic shift counter shown in FIG. 3b.

When the range selecting lever 100a is moved to a manual range position (N, R or P) via the neutral position N, a flip-flop circuit 133 is reset by a signal produced on output line at the neutral position N so that the flip-flop circuit 133 produces a set output "0" and a "1" signal is applied to line 134 via inverter 134a thus cleaning the counter 138 (see FIG. 12a). At this time, all outputs from the counter 138 (lines 127 through 130) are "zero" and all outputs from the decoder 153 are also zero.

When the range selecting lever 100a is moved to the driver range position D from the neutral position, the flip-flop circuit 133 is set by the signal on line 103. Thus, this flip-flop circuit produces a "0" reset output, and an "1" signal appears on line 135 via inverter 135a so that a differentiating circuit 136 produces a differentiated pulse as shown in FIG. 12b. The differentiated pulse is applied to the load input of the counter 138 via line 137 thus writing the preset data on lines 141 and 142 into the counter 138. Under these conditions, since the flip-flop circuit 111 is not set but in a "forward second speed mode" the binary signals on lines 141 and 142 are "10".

Since the upper two bits thereof are always "0" a preset data "0010" (see FIG. 12c) will be loaded in the counter 138. Consequently, the output of the counter 138 (lines 127 through 130) are preset to a value "0010" (see FIG. 12d). Thereafter, if a count up pulse is applied to counter 138 from the AND gate circuit 139 (see FIG. 12c), the content of counter 138 is increased, whereas if a count down pulse is applied through the AND gate circuit 140 (FIG. 12f), the content of the counter 138 is decreased.

Where the range selecting lever 100a is moved to the first range selecting position 1 from the neutral position N through a positions D and 2, both flip-flop circuits 111 and 133 are set, so that a preset data "0001" will be written in the counter by the load pulse (FIG. 12b) appearing on line 137.

Figure 13:
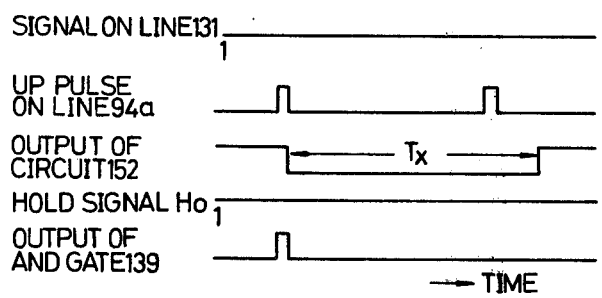
FIG. 13 is a timing chart showing one example of the operation of a logical gate circuit which applies a count up pulse to the automatic shift counter shown in FIG. 3b.

In the case of shift up, the content of the automatic shift counter 138 should be increased by the shift up pulse applied thereto from a shift up comparator 921 via AND gate circuit 94 and line 94a. But there is a upper limit for the shifted up speed stage. For this reason an automatic shifting up AND gate circuit 139 is provided on the up input side of the automatic shift counter 138 for applying a up pulse necessary for applying the up input to the automatic shift counter 138. One example of the input and output of the AND gate circuit 139 is shown in FIG. 13. As above described, unless the range select upper limit set by the range selecting lever 100a is not reached, the signal on line 131 is "1". As is clear from Table 4, if the lever 100a is at position 1, the signal on line 131 is "0" when the automatic speed changer 21 is at the forward first speed. If the lever 100a is at position 2, the signal on line 131 is "0" when the speed is at the forward fourth speed. If the lever 100a is at position D, the signal on line 131 is "0", when the speed is the forward sixth speed. As above described the signal on line 131 is related to the upper limit of the range selection and this signal is applied to the AND gate circuit 139. Further, a signal produced by a shift up inhibit time setting circuit 152 is also applied to the AND gate circuit 139 for the purpose of preventing continuous application of the up input pulses during the transient state occuring at the time of the automatic shifting operation of the speed changer 21. The shift up inhibit time setting circuit 152 is a type of a timer circuit and when given a speed detection pulse via the OR gate circuit 149 it produces an output "0" for an interval $T_x$ thereby inhibiting the operation of the AND gate circuit 139. The hold signal Ho is converted into a signal "0" by the manual operation when it is desired to hold the automatic shift whereas into "1" when hold is not desired. When the hold signal Ho is changed to "0", the count up or count down operation of the counter 138 is interrupted thereby holding the count at that time.

In the case of shift down, the content of the automatic shift counter 138 is decreased by a shift down pulse applied to the counter from a shift down comparator 922 via AND gate circuit 95 and line 95a. For the purpose of realizing a shift down condition, there is provided an automatic shift down gate circuit constituted by AND gate circuit 140, 145 and 146 and an OR gate circuit 147. FIG. 14 shows one example of the input and output of the automatic shift down gate circuit. And gate circuit 145 performs "forced shift down" and one example of its input and output is shown in FIG. 14a. For example, when the car is running at the forward sixth speed stage by setting the lever 100a to the drive range D, and when the lever is then switched from position D to position 2, it is necessary to forcibly shift down according to the order of forward sixth speed→forward fifth speed→forward fourth speed. In this case, the signal on the output line 132 of the comparator 126 becomes "1" so that the AND gate circuit 145 will be enabled provided that the manual hold signal $H_0$ is also "1". However, where the speed detected by the speed sensor 20 is high, rapid shift down causes the engine to become overspeed so that it is necessary to prevent this. For this reason, a down inhibit signal is applied to the AND gate circuit 145 from the shift down inhibit comparator 923 via AND gate circuit 96 and line 96a. When the detected speed is higher than the speed determined by a down inhibit line 933 shown in FIG. 9 the signal on line 96a is "0" thus holding the present speed stages. If the detected speed becomes lower than the set speed determined by the down inhibit line 933 a "1". pulse is produced on line 96a so that a down pulse is produced by the AND gate circuit 145 thus quickly effecting the forced shift down.

When normal shift down is performed, the signal on line 132 is "0" and the output of the inverter 143 is "1". When the manual hold signal $H_0$ is "1" at this time, the AND gate circuit 146 is enabled so that it can produce a pulse with a timing of the shift down pulse applied thereto from line 95a (see FIGS. 14a, 14b). The output of AND gate circuits 145 and 146 are applied to the AND gate circuit 140 via OR gate circuit 147. The AND gate circuit 140 is connected to receive the signal from the shift inhibit time set circuit 151, the shift down lower limit signal from the NAND gate 124 circuit, and the signal on line 154 provided by decoder 153 corresponding to the forward first speed and inverted by inverter 154a. The shift inhibit time set circuit 151 is a timer circuit having an operating time of Ty and producing a signal "0" having a width of Ty at the time of speed change thus securing the operating time for one shift down. As above described, the NAND gate circuit 124 is used to limit the shift down according to the selected shift mode. The output of the inverter 154a is "0" when the present speed stage is at the forward first speed so that the AND gate circuit 140 is disenabled thus preventing the content of the counter from being decreased further. Consequently, also in the case of the "forward first speed shift mode" the lower limit of the shift down is the forward first speed. FIGS. 14a, 14b and 14c shows the relationship between the input and the output of the AND gate circuit 140 when the conditions determined by the NAND gate circuit 124 and the inverter 154a are satisfied.

As the output from the automatic shift counter 138 is expressed by binary numerals a decoder 153 is provided for converting then into decimal numerals corresponding to respective speed stages. The decoder 153 decodes the binary signals on the output lines 127 through 130 of the counter 138 for signals on six output lines 154 through 159 respectively corresponding to from the forward first speed to the forward sixth speed. This decoder may be made of the type SLL4028A integrated circuit sold by solid state Scientific Co. The relationship between the binary input and the decimal output of the decoder 153 is shown in the following Table 5 in which the number of the lines having outputs "1" in also included.

Table 5

| speed stage | input line 130 | 129 | 128 | 127 | output line |
|---|---|---|---|---|---|
| forward first speed | 0 | 0 | 0 | 1 | 154 |
| 2 | 0 | 0 | 1 | 0 | 155 |
| 3 | 0 | 0 | 1 | 1 | 156 |
| 4 | 0 | 1 | 0 | 0 | 157 |
| 5 | 0 | 1 | 0 | 1 | 158 |
| 6 | 0 | 1 | 1 | 0 | 159 |
| 7 | 0 | 1 | 1 | 1 | 168 |
| 8 | 1 | 0 | 0 | 0 | 169 |

Figure 17:
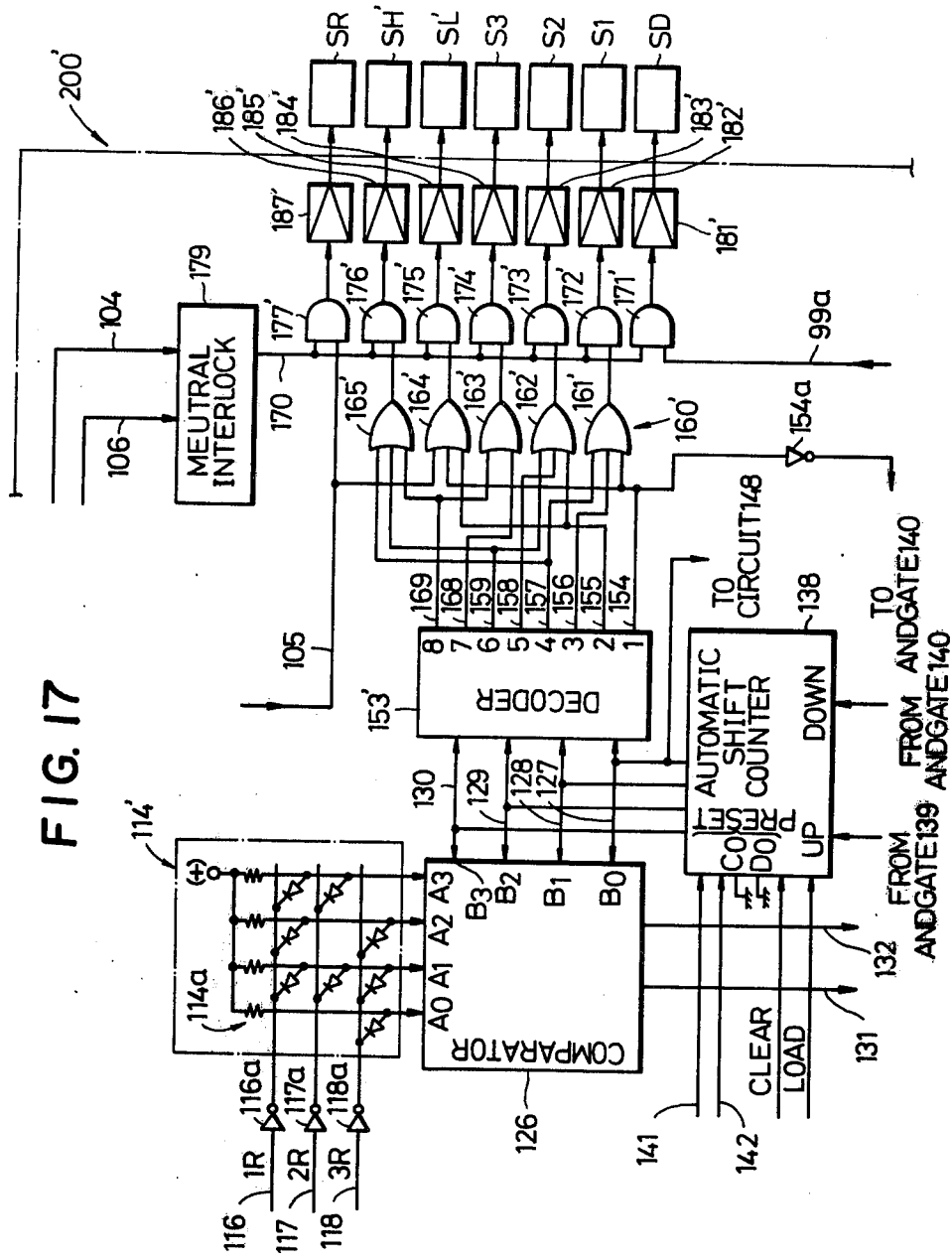

It is possible to apply the invention for an automatic speed changer having 8 to 10 forward speed, but in Table 5, the case of forward eight speed is also shown. Output lines 168 and 169 are shown in FIG. 17 to be described later.

The automatic speed change detection pulse generator 148 comprises a differentiating circuit, for example, which is connected to receive the signal of the least significant digit (line 127) of the automatic shift counter 138 for producing a speed change detection pulse when the signal changes from "1" to "0" or from "0" to "1". A manual speed change detection pulse generator 150 is connected to receive the output of the differential pulse generator 109 for producing a speed change detection pulse when the switch of the range selecting sensor 100 is operated. The output of the circuits 148 and 150 are applied to shift inhibit time set circuits 151 and 152 respectively through OR gate circuit 149. The shift inhibit intervals Ty and Tx (see FIGS. 13 and 14) and determined by considering the times required for one shift down operation and the one shift up operation of the speed changer 21.

A group of OR gate circuit 160 are provided for the purpose of distributing the signals of respective speed stages represented by the outputs of the decoder 153 among solenoids $S_1$ through SD which correspond to respective speed stages shown in Table 2. According to Table 2 the "forward first speed" is provided when solenoids $S_1$ and $S_L$ are energized so that the signal on the output line 154 of the decoder are applied to the inputs of the OR gate circuits 161 and 164. As shown, the OR gate circuit 161, AND gate circuit 172 and amplifier 182 correspond to solenoid $S_1$; OR gate circuit 162, AND gate circuit 173 and amplifier 183 correspond to solenoid $S_2$; OR gate circuit 163, AND gate circuit 174 and amplifier 184 correspond to solenoid $S_3$; and OR gate circuit 164, AND gate circuit 175 and amplifier 185 correspond to solenoid SL. Since solenoid $S_1$ is energized at the "forward second speed", the signal on line 155 is applied to OR gate circuit 161. At the "forward third speed" since solenoids $S_2$ and SL are energized, the signal on line 156 is applied to OR gate circuits 162 and 164. At the "forward fourth speed" since the solenoid $S_2$ is energized, the signal on line 157 is applied to OR gate circuit 162, whereas as the "forward fifth speed", since solenoids $S_3$ and SL are energized, the signal on line 158 is applied to OR gate circuits 163 and 164. At the "forward sixth speed" since solenoid $S_3$ is energized the signal on line 159 is applied to the OR gate circuit 163.

The outputs of OR gate circuits 161–164 are applied to AND gate circuits 172 through 175 respectively, and the signal on the output line 99a of the torque converter lock up flip-flop circuit 99 is applied to AND gate circuit 171. The signal on the reverse position (R) detection line 105 of the range selecting sensor 100 is applied to AND gate circuit 176. The other inputs of the AND gate circuits 171 through 176 are connected to receive the output of a neutral interlock circuit 179 which is normally at "1". The signals "1" produced by AND gate circuits 171 through 176 in response to the output of OR gate circuits 161 through 164, the output of the flip-flop circuit 99 and the reverse position detection signal are applied to solenoid driving amplifiers 181 through 186 the outputs thereof being used to energize corresponding solenoid SD, $S_1$, $S_2$, $S_3$, SL and SR respectively.

The purpose of the interlock circuit 179 is to prevent generation of a solenoid selection signal unless the range selecting lever 100a is set to the neutral position N when the key switch (Not shown) is turned ON for the purpose of starting the engine. For example, a memory circuit (not shown) is set such that a "0" signal is produced on the output line 170 when the engine start key switch is turned ON, so as to reset the memory circuit when a detection signal of the neutral position N appears on the neutral position detection line 104 from the range selecting sensor 100 thus producing a "1" signal on output line 170. In addition to the engine starting time, the neutral interlocking circuit 179 can also be used when the lever 100a is set at the parking position p or when the engine is under overload condition. More particularly, the neutral interlocking circuit 179 is set so that a "0" signal is produced on the output line 170 when a detection signal of the parking slate is applied from the range selecting sensor 100 via line 106. When the lever 100a is moved to the neutral position N the circuit 179 is reset so that the signal on the output line 170 becomes "1" when a neutral position detection signal is applied through line 104. If an OR gate circuit is inserted in line 106 and an engine overload detection signal and an engine start detection signal are applied to the inputs of the OR gate circuit together with the parking position detection signal, then AND gate circuits 171 through 176 will not produce any solenoid selection signal when the range selecting lever 100a is moved to the other range from the parking position or when the engine is overload, or when the engine is started, unless the lever 100a is returned again to the neutral position. In other words, the neutral interlocking circuit 179 includes such memory circuit as a flip-flop circuit.

As above described, the solenoids $S_1$, $S_2$, $S_3$ SL, SR and SD are associated with selector valve groups 52 and 81 shown in FIG. 2 for pilot operating shift valve groups 51, 65 and 71 for operating clutch cylinders 1c, 2c, 3c, Rc, Dc, L and H respectively. The relationship between the operation states of the solenoids $S_1$ through SD and clutch cylinders 1c through Dc and the speed stages is shown in Table 1 and 2.

The shift modes that can be realized by the forward six stage automatic speed changer shown in the above described embodiment can be classified into the following two modes. (corresponding to the range selecting stage D)

1. A shift mode in which the speed is automatically changed in a range of from the forward first speed to the forward sixth speed (when the lever 100a is moved through position 1)
2. A shift mode in which the speed is automatically changed in a range of from the forward second speed to the forward sixth speed (when the lever 100a is not moved through position 1).

The following three different shift modes are possible by selecting the upper limit of the range by the operation of the lever 100a.

3. An automatic speed change in a range of from the forward first speed to the forward fourth speed (a case of the range selecting stage 2)
4. An automatic speed change in a range of from the forward second speed to the forward fourth speed (a case of the range selecting stage 2)
5. Only the forward first speed (a case of the range selecting stage 1)

An embodiment of this invention as applied to a forward 8 stages reverse 1 stage automatic speed changer will now be described with reference to FIGS. 15, 16 and 17, in which elements similar to those shown in FIGS. 1 to 3 are designated by the same reference characters.

FIG. 15 diagrammatically shows a power transmission system including a forward 8 stage—reverse 1 stage gear speed changer 500. In the power transmission system, a planetary gear groups 501 and 502 are substituted for the planetary gear group 27 shown in FIG. 1. The planetary gear group 501 comprises a sun gear input 503 connected to the torque converter output shaft 13, a carrier output 504, and a ring gear 506 fixed by a low speed clutch 505 engaged by the operation of a low speed clutch cylinder L'. The planetary gear group 502 comprises an input ring gear 508 connectable to the carrier 504 of the planetary gear group 501 through a high speed clutch 507 which is engaged when a high speed clutch cylinder H' operates, an output carrier 507, and a sun gear 511 fixed by a medium speed clutch 510 engaged by the operation of a medium speed clutch cylinder M. The path from the planetary gear groups 35, 36 and 37 to the output shaft 12 is the same as that shown in FIG. 1. The speed stages of the forward 8 stages and reverse 1 stage are obtained by operating clutch cylinders 1c, 2c, 3c, L', H', M and Rc thereby selectively engaging clutches 47–50, 505, 507 and 510 according to the combination shown in the following Table 6. Similar to FIG. 1 the direct coupling clutch 16 is engaged by the operation of the clutch cylinder Dc when a predetermined speed is reached.

| speed stage | clutch cylinder (clutch) | | | | | | | |
|---|---|---|---|---|---|---|---|---|
| | 1c (47) | 2c (48) | 3c (49) | Rc (50) | L' (505) | M (510) | H' 507 | Dc (16) |
| reverse | | | | x | x | | | corresponds |
| neutral | | | | | | x | | ponds |
| forward 1st speed | x | | | | x | | | to pre- |
| 2 | | x | | | x | | | deter- |
| 3 | x | | | | | x | | mined |
| 4 | x | | | | | | x | speed |
| 5 | | x | | | | x | | |
| 6 | | x | | | | | x | |
| 7 | | | x | | | x | | |
| 8 | | | x | | | | x | |

Remark
x ... clutch engaged.

Figure 16:
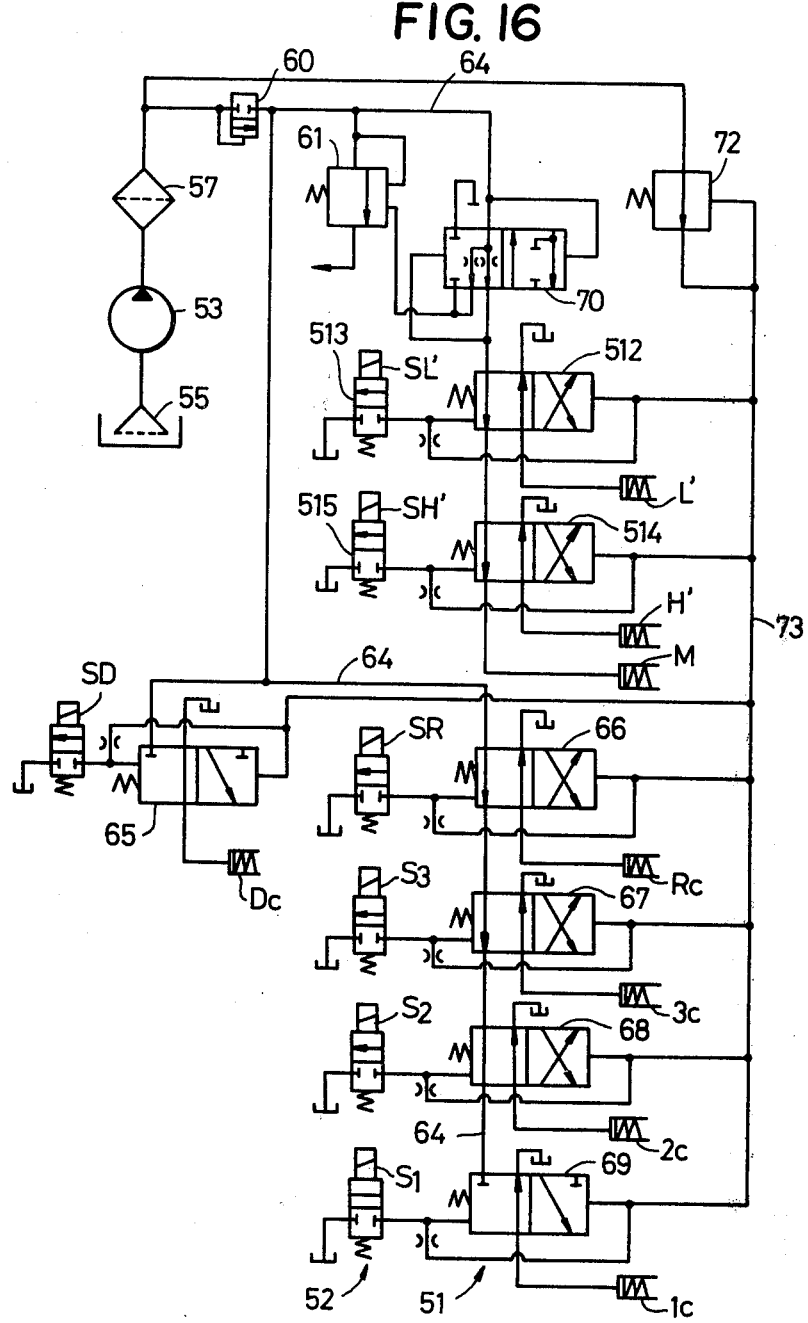
FIG. 16 shows one example of the fluid pressure circuit utilized in the embodiment shown in FIG. 15.

FIG. 16 diagrammatically shows a fluid pressure circuit for operating clutch cylinders 1c, 2c, 3c, Rc, Dc, L', H' and M. The fluid pressure circuit is different from that shown in FIG. 2 in that the H/L clutch shift valve 71 and the selector valve 81 shown in FIG. 2 are substituted by a shift valve 512 and a selector valve 513 which are used to operate the low speed clutch cylinder L', and a shift valve 514 and a selector valve 515 which are used to selectively operate the high speed clutch cylinder H' and the medium speed clutch cylinder M. The selector valves 513 and 515 are operated by solenoid SL' and SH' respectively. In the same manner as in FIG. 2, when solenoids S1, S2, S3, SR and Sd are energized, clutch cylinders 1c, 2c, 3c Rc, and Dc are operated respectively. The relationship between respective speed stages and the energization of the solenoids in shown in the following Table 7.

Table 7

| speed stage | solenoid | | | | | | |
|---|---|---|---|---|---|---|---|
| | S1 | S2 | S3 | SR | SL' | SH' | Sb |
| reverse | | | | x | x | | corres- |
| neutral | | | | | | | ponds |
| forward 1st speed | x | | | | x | | to pre- |
| 2 | | x | | | x | | deter- |
| 3 | x | | | | | | mined |
| 4 | x | | | | | x | speed |
| 5 | | x | | | | | |
| 6 | | x | | | | x | |
| 7 | | | x | | | | |
| 8 | | | x | | | x | . |

Remark
x ... solenoid energized.

Signals that automatically control the energization and deenergization of respective coils $S_1$, $S_2$, $S_3$, $SR_1$, SL', SH' and SD are provided by a electronic controller 200', which can be formed by modifying a portion of the electronic controller 200 shown in FIG. 3. FIG. 17 shows a modified portion of the electronic controller 200, the portions not shown being identical to those shown in FIGS. 3a and 3b.

However, the set valves of the matrix circuits 926 and 927 shown in FIG. 3a are somewhat modified because the range of speed change is changed to forward 8 stage-reverse 1 stage system.

Where the circuit in constructed such that the range selecting command signals 1R, 2R, and 2R corresponding to respective range selecting stages (positions 1, 2 and D) of the range selecting lever 100a are used to designate the upper limits of the speed stages of the automatic speed change as the forward first speed (F1), the forward fifth speed (F5) and the forward eight speed (F8) respectively, the diode matrix 114' of the range selecting circuit 113 is constructed to form a binary program corresponding to decimal numeral 1, 5 and 8, as shown in the following Table 8.

Table 8

| position of lever 100a | maximum speed stage | diode matrix | | | |
|---|---|---|---|---|---|
| | | $A_0$ | $A_1$ | $A_2$ | $A_3$ |
| D(3R) | F8 | 0 | 0 | 0 | 1 |
| 2(2R) | F5 | 1 | 0 | 1 | 0 |
| 1(1R) | F1 | 1 | 0 | 0 | 0 |

Remark
0 ... there is a diode
1 ... there is no diode

The operations of the comparator 126 and the automatic shift counter 138 are the same as those of FIG. 3. Of course, preset data are applied to the counter 138 via lines 141 and 142 so that either one of the shift modes of "forward first speed start" and "forward second speed start". Consequently, possible shift modes are:

1. a range of from the forward first speed to the forward eight speed.
2. a range of from the forward second speed to the forward eight speed.

In addition to these modes the following modified shift modes are also possible.

3. a range of from the forward first speed to the forward fifth speed.
4. a range of from the forward second speed to the forward fifth speed.
5. only the forward first speed.

The first mode is obtained when the range selecting lever 100a is moved from the neutral position N to the drive range position D via the first range selecting position 1. The second mode is obtained by moving the lever from position N to position D. The third mode is obtained by moving the lever 100a from position N to position 2 via position 1, the fourth mode is obtained by moving the lever from position N to position 2, and the fifth mode is obtained by moving the lever from position N to position 1.

The output of the automatic shift counter 138 is decoded by decoder 153'. Since the speed changer has forward 8 stages, in addition to output lines 154 through 159 corresponding to decimal numerals 1 to 6, there are provided output lines 168 and 169 corresponding to decimal numerals 7 and 8. This is shown in Table 5. The OR gate circuit group 160' is provided with five OR gate circuits 160' through 165' which are connected to the applied with the signals on lines 154 through 159, 168 and 169 which are necessary to energize solenoids $S_1$, $S_2$, $S_3$, SL' SH', SR and SD according to the combination shown in Table 7 in response to the outputs from the decoder 153'. An OR gate circuit 161' is provided for energizing solenoid $S_1$ in response to decimal outputs 1, 3 and 4 (on lines 154, 156 and 157) of the decoder 153'. The purpose of the OR gate circuit 162' is to energize solenoid $S_2$ in response to the decimal output 2, 5 and 6 on lines 155, 158 and 159 of the decoder 153'. The purpose of the OR gate circuit 163' is to energize solenoid $S_3$ in response to the decimal outputs 7 and 8 on lines 168 and 169 of the decoder 153'. The purpose of an OR gate circuit 164' is to energize solenoid SL' in response to the decimal outputs 1 and 2 on lines 154 and 155 of the decoder 153', and a detection signal of the range selection position P on line 105. An OR gate circuit 165' is used to energize solenoid SH' in response to decimal outputs 4, 6 and 8 on lines 157, 159 and 169 respectively produced by dicoder 153'. The solenoid SR is energized when the detection signal of the linear range selecting position R is applied to the AND gate circuit 177' from line 105, and the solenoid SD is energized when a torque converter up speed is applied to the AND gate circuit 171' from line 99a. In the same manner as above described, the AND gate circuits 171' through 177' are enabled by the signals on line 170. Amplifiers 181' through 187' are provided for the purpose of energizing solenoids SD, $S_1$, $S_2$, $S_3$, SL', SH' and SR respectively.

Although in the foregoing embodiments, a forward 6 stage speed changer and a forward 8 stage speed changer have been described, the number of speed stages can be varied by merely modifying the diode matrixes 926, 927 and 114.

As can be understood from the foregoing description, according to this invention, where the throttle opening is maintained at the idle position, even when the engine speed increases a low speed stage is automatically held without shifting up so that even when a car descends a steeply inclined road so that load is small and an engine brake is necessary it is possible to apply the engine brake without the necessity of manually switching the range selecting lever.

Furthermore, as the shift down speed and the shift up speed is set by a diode matrix circuit it is possible to readily change the automatic speed changing points. Accordingly the invention is applicable to cars of any type.

The above embodiment has been described with respect to a case where the invention has been applied to a vehicle having a torque converter. If the invention is to be applied to vehicles having no torque converter such as a bulldozer, a dozer shovel and a tractor shovel, a construction as described hereinbelow may be employed.

FIG. 18 shows an example of automatic speed change control apparatus of a forward 4 stage-reverse 4 stage change gear having no torque converter. Besides absence of the torque converter, this example is different from the example shown in FIG. 1 only in construction of transmission owing to the employment of the forward 4 stage-reverse 4 stage change gear. More specifically, a forward or reverse movement is selected by switching between a planetary gear 300F and a double planetary gear group 300 R by means of clutches F and R and gear ratios of first through fourth speeds are obtained by operation of clutches 301, 302, 303 and 304. Ranges $R_1$, $R_2$, N, $F_3$, $F_2$, $F_1$ switched by a range lever 100a are as shown in the follow Table 9.

Table 9

| Range | | Speed Stage |
|---|---|---|
| $F_1$ | (heavy excaviting, ripping) | Forward first speed (manual select) |
| $F_2$ | (forward earth shoving, excavating) | Forward first speed - Forward second speed (automatic shift) |
| $F_3$ | (forward earth carrying running) | Forward first speed - Forward fourth speed (automatic shift) |
| N | | |
| $R_2$ | (reverse running) | Reverse first speed - Reverse fourth speed (automatic shift) |
| $R_1$ | (reverse grading, running) | Reverse first speed (manual select) |

Figure 19:
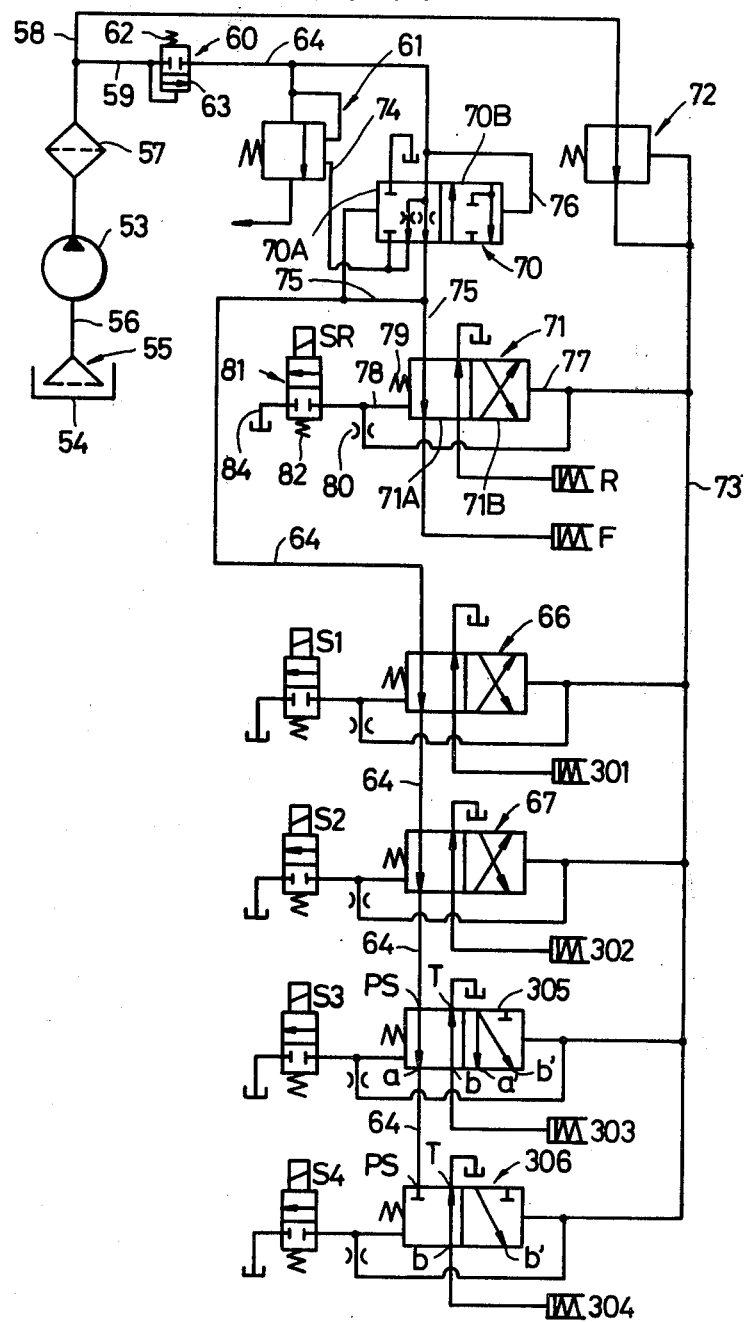
FIG. 19 is a circuit diagram of a fluid pressure control circuit for showing fluid pressure control in the embodiment shown in FIG. 18.

FIG. 19 shows one example of a hydraulic circuit for controlling the clutches F, R, 301–304. As for this circuit, a circuit of a construction which is similar to the one shown in FIG. 2 may be employed. It is to be noted, however, that a special arrangement is made in this embodiment, for a torque converter is not used therein. As the clutch 304 (FIG. 18), a rotary clutch is employed. Since the rotary clutch requires a longer filling time for filling hydraulic fluid than the other fixed type clutches F, R, 301–303, absence of transmission of power tends to occur in changing over from the fixed type clutch 303 to the rotary clutch 303. For preventing occurrence of such failure, a valve 305 controlling the fixed type clutch 303 is adapted to operate the rotary clutch 304 and the fixed type clutch 303 in parallel.

More specifically, the valve 305 is constituted by a 4-way valve having ports SP, T, a and b. If a solenoid $S_3$ is energized for changing the position, fluid is fed not only from a port b' to the clutch 303 but from a port a' to a valve 306 which is provided for controlling the rotary clutch 304. Relationship between hydraulic pressures applied to the fixed type clutch 303 and that applied to the rotary clutch 304 at this time is shown in FIG. 20. In FIG. 20, time t shows the filling time of the rotary clutch 304, time $t_0$ duration in which the valves 305 and 306 operate in parallel, and time N duration in which absence of power transmission occurs in changing over from the fixed type clutch 303 to the rotary clutch 304. As will be apparent from FIG. 20 duration in which absence in power transmission occurs is held at an extremely short time whereby a smooth change speed can be achieved e.g. in a bulldozer which is shoving earth.

In this embodiment, a rotary clutch is employed as the four speed clutch. If other clutch is constituted by a rotary clutch, the valve of the above described construction may be provided in a former stage of the valve for the rotary clutch for effecting a parallel operation of a fixed type clutch controlled by this valve and the rotary clutch whereby absence in power transmission can be effectively avoided. In a case where a first speed clutch 1 is a rotary clutch, the valve of the above described construction may be employed as a first speed shift valve.

Figure 21:
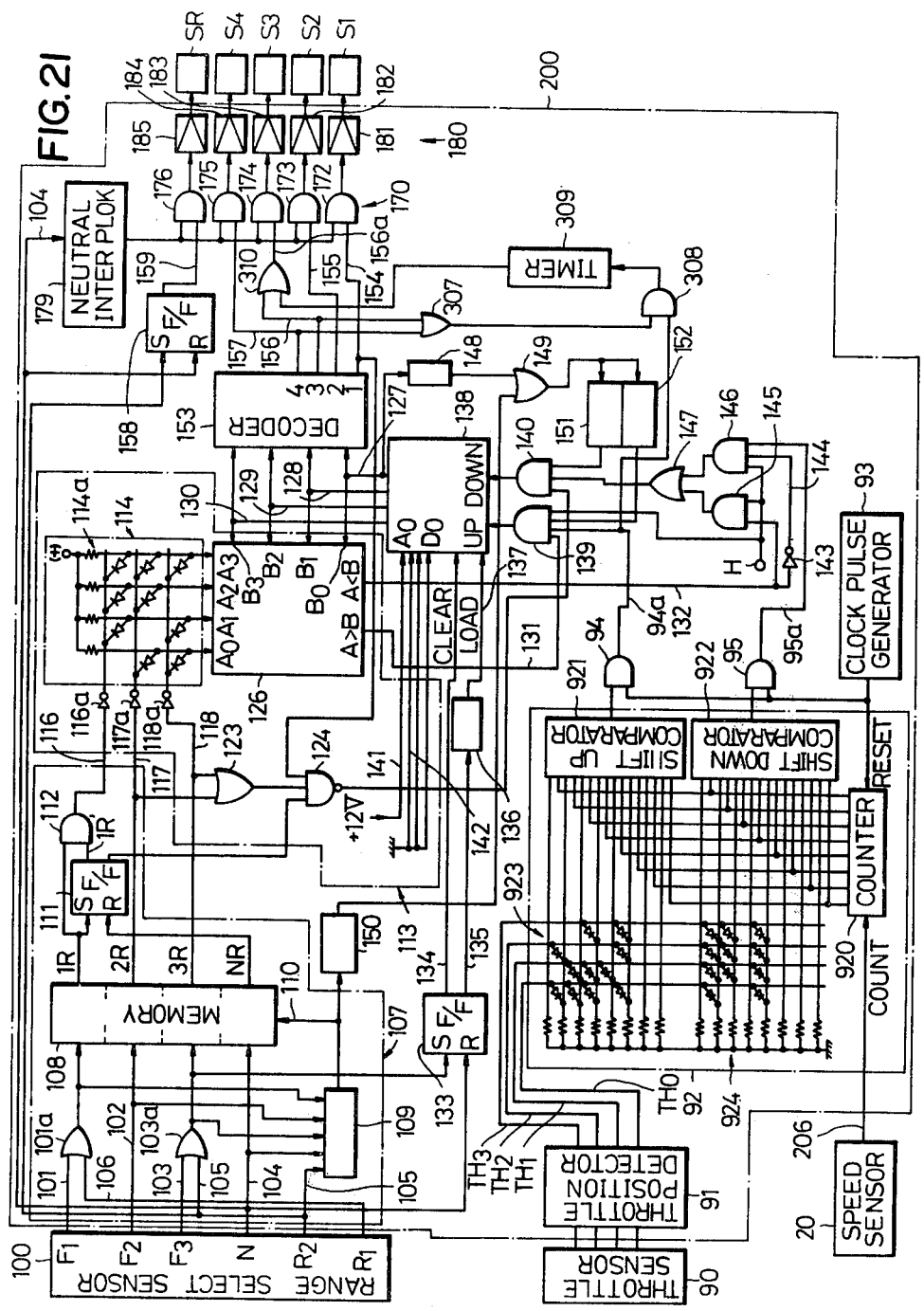
FIG. 21 is a block diagram showing in detail an electronic control section shown in FIG. 18.

FIG. 21 shows an example of an electronic controller 200 for producing signals to be supplied to solenoids $S_1$-$S_R$ in the hydraulic circuit shown in FIG. 19. The electronic controller 200 is of a construction similar to the one shown in FIGS. 3(a) and 3(b) and is different only in processing of a signal supplied from a range select sensor 100 and in signals to be supplied to the solenoids $S_1$-$S_R$. Accordingly, the same component parts throughout FIGS. 19 and 21 are designated by the same reference characters and description thereof will be omitted.

The range select sensor 100 is provided for detecting a range selected by the select lever 100a (FIG. 18). The sensor 100 provides a signal representing a selected range on either one of lines 101, 102, 103, 104 and 105 corresponding to ranges $F_1$, $F_2$, $F_3$ N, $R_2$ and $R_3$ in accordance with a range selected by the select lever 100a (FIG. 18).

As has been shown in Table 9, the ranges $F_3$ and $R_2$ employ an automatic speed change including the first to fourth speed stages whereas the ranges $F_1$ and $R_1$ employ the first speed stage respectively. Accordingly, a signal respresenting the range $F_3$ and a signal representing the range $R_2$ can be used in common, whereas a signal representing the range $F_1$ and a signal representing the range $R_1$ can be used in common. Thus, signals on the lines 103 and 105 are applied to a memory circuit 108 through an OR gate 103a and signals on the lines 101 and 106 are applied to a memory circuit 108 through an OR gate 101a. In this manner, simplification in the circuit design has been achieved.

Since the rotary clutch 304 and the fixed type clutch 303 (FIG. 18) are operated in parallel in switching from the fixed type clutch to the rotary clutch, an arrangement is made so that signals to the solenoids $S_3$ and $S_4$ for operating the valves 305 and 306 (FIG. 19) are caused to coexist for a certain period of time. Signals on output lines 156 and 157 of a decoder 153 corresponding to the third and fourth speeds are applied to an AND gate 308 through an OR gate 307. The AND gate 308 receives as its other input a shift-up pulse from a line 94a. Accordingly, the AND gate 308 is enabled if the shift-up pulse is applied thereto when the speed stage is in the third speed, and provides a signal "1" to a timer circuit 309.

The timer circuit 309 consists of an off-delay timer whose output becomes "1" immediately when its input signal has risen to "1" but becomes "0" not immediately when its input signal has fallen to "0" but with a delay of time $t_0$. The output of the timer 309 is applied to an OR gate 310 together with the signal on the output line 156 and output on a line 156a as a signal corresponding to the third speed. In this manner, the signal on the line 156a does not become "0" even if the signal on the line 156 disappears but continues to be "1" during the operation time $t_0$ of the timer 309, whereby the fixed type clutch 303 and the rotary clutch 304 can be operated in parallel.

What is claimed is:

1. An automatic speed change control apparatus comprising a throttle position detection circuit for detecting the throttle opening of an internal combustion engine, a shift pattern setting circuit for setting an automatic speed changing point corresponding to the output from said throttle position detection circuit, a speed sensor for detecting a speed of an input shaft of a speed changer, a comparator for comparing the output from said speed sensor with a set value of said shift pattern setting circuit, and a fluid pressure control apparatus responsive to the output from said comparator for controlling a speed changer of said engine whereby said speed changer is controlled in accordance with an automatic speed changing point which is set by said shift pattern setting circuit.

2. The apparatus according to claim 1 in which a shift up speed corresponding to a minimum throttle opening among a plurality of automatic speed changing points which are set by said shift pattern setting circuit is a permissible maximum speed of the input shaft of the speed changer.

3. The apparatus according to claim 1 wherein said shift pattern setting circuit comprises a diode matrix circuit setting automatic speed changing points corresponding to each of throttle openings.

4. In an electronic fluid pressure type automatic speed change control apparatus of the type comprising a counter counting a count up pulse or a count down pulse generated in accordance with the running condition of a car, and a speed changer which is operated so as to select a speed stage designated by the content of said counter circuit, the improvement in said apparatus which comprises means for changing a lower limit speed stage for automatic speed change range selected by a range select lever, and a counter control circuit for starting the count up operation of said counter circuit from a first value corresponding to said lower limit speed stage and for preventing the content of said counter circuit from decreasing below said first value at the time of counting down.

5. The apparatus according to claim 4 wherein said means for changing a lower limit speed stage comprises a memory circuit which is set corresponding to a predetermined position of said range select lever and reset corresponding to the other positions of said lever thereby changing said lower limit speed in response to the manual operation of said lever passing through said predetermined position or said other positions.

6. In an electro-fluid pressure type automatic speed change control apparatus of the type comprising a counter circuit counting a count up or count down pulse generated in accordance with the running condition of a car, and a speed changer which is operated so as to select a speed stage corresponding to the content of said counter circuit, the improvement is said apparatus which comprises a code converting circuit for converting a signal generated corresponding to an operation position of said range select lever into a code signal, a comparator for comparing the output of said code converting circuit with the content of said counter circuit, and a count control circuit which controls the count up or count down operation of said counter circuit in response to the output of said comparator.

7. In an automatic speed change control apparatus of the type wherein a speed range of a speed changer is controlled within a selected speed change range selected by a range select lever, the improvement in said apparatus which comprises a logical circuit which produces a speed change range selection signal utilized for forward and reverse runnings based on a signal representing the selection of a forward speed change range and a signal representing the selection of a reverse speed change range, and a circuit responsive to said speed change range selection signal for setting the upper and lower limits of a speed change stage.

8. An automatic speed change control apparatus comprising a throttle position detection circuit for detecting the throttle opening of an internal combustion engine, a shift pattern setting circuit for setting an automatic speed changing point corresponding to the output from said throttle position detection circuit, a speed sensor for detecting a speed of an input shaft of a speed changer, a first comparison circuit for comparing the output from said speed sensor with a set value of said shift pattern setting circuit to produce a pulse, a counter circuit for counting said pulse, a range select lever for selecting either one of a forward running automatic speed change range and a reverse running automatic speed change range, a logic circuit for generating a speed change range selection signal commonly used for both forward and reverse runnings in response to a forward speed change range selection signal or a reverse speed change selection signal produced in accordance with an operation position of said range select lever, a code converting circuit for converting the speed change range selection signal to a code signal, a second comparison circuit for comparing the output of said code converting circuit with the content of said counter circuit, a first count control circuit which controls the count up or count down operation of said counter circuit in response to the output of said comparator, changing means for changing a lower limit speed stage of the automatic speed change range selectively by operation of said range select lever, and a counter control circuit for starting the count up operation of said counter circuit from a first value corresponding to said lower limit speed stage and for preventing the content of said counter circuit from decreasing below said first value at the time of counting down, a speed change mechanism of said apparatus being controlled in such a manner that a speed stage corresponding to content of said counter circuit and a turning direction corresponding to the forward and reverse operation position of said range select lever are selected.

9. In an automatic speed change control apparatus of a type wherein a speed stage comprising a fixed type clutch and a rotary clutch is controlled by actuation of a shift valve, the improvement in said apparatus comprising a shift valve for controlling the fixed type clutch whose ports are so constructed that pressurized fluid is supplied also to a shift valve provided for the rotary clutch when the pressurized fluid is supplied to the fixed type clutch, and a delay circuit for delaying a signal for energizing said shift valve for the fixed type clutch by a predetermined period of time in switching from the fixed type clutch to the rotary clutch.

* * * * *